(12) United States Patent
Kadono

(10) Patent No.: US 6,229,930 B1
(45) Date of Patent: May 8, 2001

(54) IMAGE PROCESSING APPARATUS, IMAGE PROCESSING METHOD, IMAGE DATA STRUCTURE, AND DATA STORAGE MEDIA

(75) Inventor: Shinya Kadono, Kobe (JP)

(73) Assignee: Matsushita Electric Industrial Co., Ltd. (JP)

(*) Notice: Subject to any disclaimer, the term of this patent is extended or adjusted under 35 U.S.C. 154(b) by 0 days.

(21) Appl. No.: 09/256,308

(22) Filed: Feb. 24, 1999

(30) Foreign Application Priority Data

Feb. 27, 1998 (JP) ................................. 10-046971

(51) Int. Cl.$^7$ ........................................ G06K 9/36
(52) U.S. Cl. ........................ 382/284; 382/236; 382/298
(58) Field of Search ........................... 382/284, 298, 382/236, 233

(56) References Cited

U.S. PATENT DOCUMENTS

| | | | |
|---|---|---|---|
| 5,500,684 | * 3/1996 | Uya | 348/592 |
| 6,078,694 | * 6/2000 | Takahashi et al. | 382/236 |
| 6,088,485 | * 7/2000 | Kadono | 382/243 |

FOREIGN PATENT DOCUMENTS 6-319132   11/1994 (JP).

* cited by examiner

*Primary Examiner*—Yon J. Couso
(74) *Attorney, Agent, or Firm*—Parkhurst & Wendel, L.L.P.

(57) ABSTRACT

A transparency coding apparatus for coding a transparency signal corresponding to an object constituting an image, which transparency signal indicates a composition ratio used when compositing an image signal of the object with another image signal. This apparatus comprises a scaling value detection unit for receiving a transparency signal whose signal value has been changed with a fixed scale factor, and detecting a specific signal value corresponding to the fixed scale factor as a scaling value; a scaling unit for performing scaling on the transparency signal whose signal value has been changed, by using the detected scaling value, and outputting a scaled transparency signal whose signal value is restored to the original signal value before the change; a first coding unit for coding the scaling value to output coded scaling value data; a blocking unit for dividing the scaled transparency signal into signals corresponding to plural blocks each comprising a predetermined number of pixels, and outputting a transparency signal corresponding to each block; and a second coding unit for coding the transparency signal corresponding to each block to output a coded transparency signal. Therefore, the process of uniformly changing the transparency values of the transparency signal in VOP units, can be performed easily and independently of coding of the transparency signal, while improving the coding efficiency of the transparency signal.

11 Claims, 12 Drawing Sheets

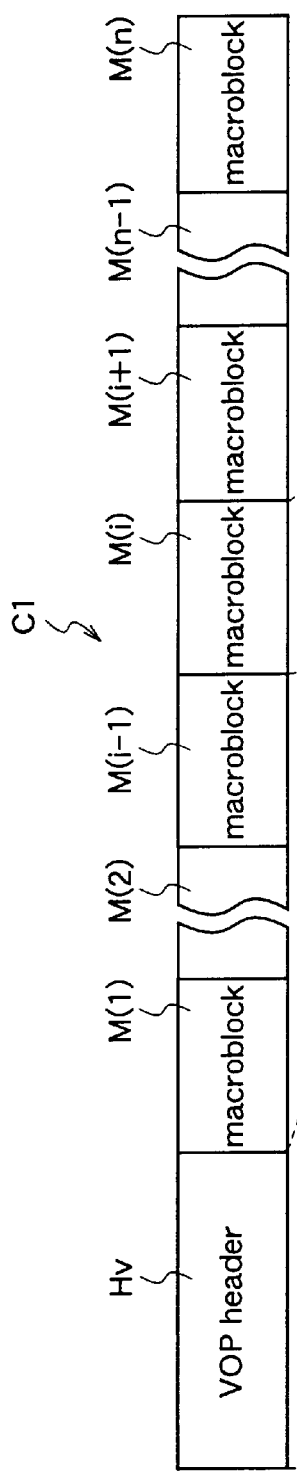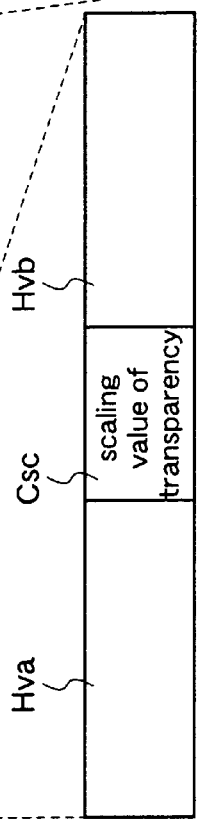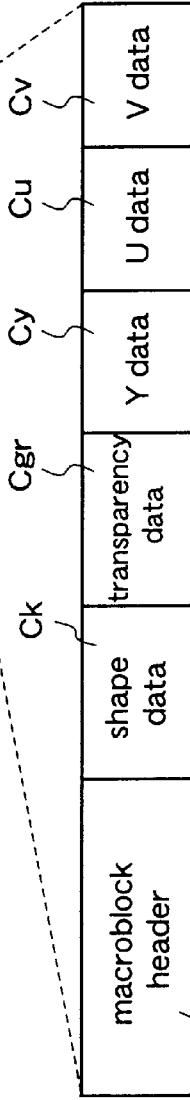
Fig.5 (a)   Fig.5 (b)   Fig.5 (c)   Fig.5 (d)

Prior Art

Prior Art
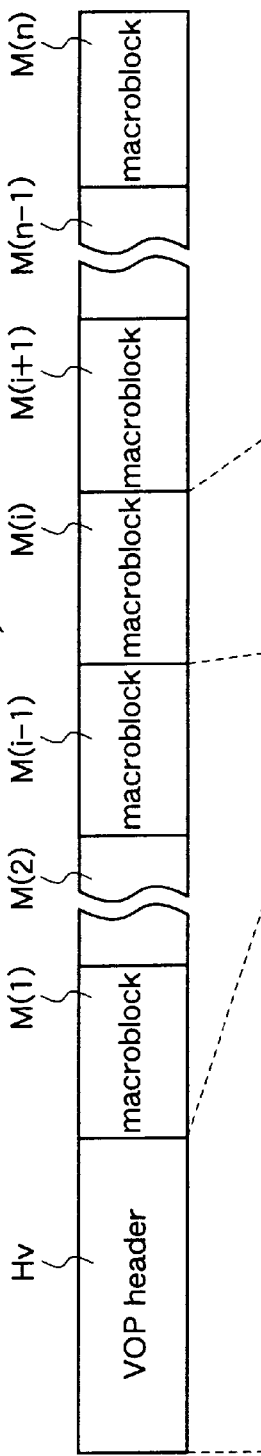
Fig.12 (a)
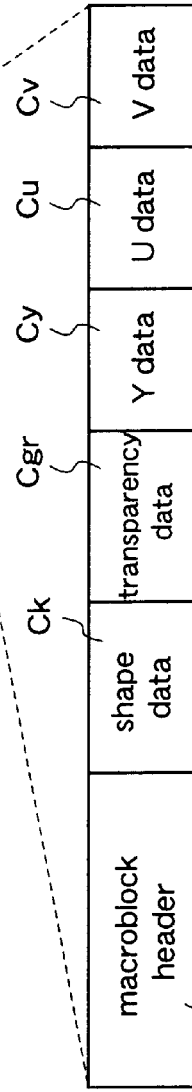
Fig.12 (b)
Fig.12 (c)
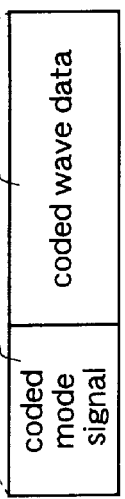
Fig.12 (d)

IMAGE PROCESSING APPARATUS, IMAGE PROCESSING METHOD, IMAGE DATA STRUCTURE, AND DATA STORAGE MEDIA

FIELD OF THE INVENTION

The present invention relates to image processing apparatuses, image processing methods, and data storage media and, more particularly, to an apparatus and a method for efficiently coding a transparency signal, an apparatus and a method for decoding a transparency signal coded by the coding apparatus or method, and a data storage medium containing a program implementing the transparency signal coding method or decoding method by software.

In the present invention, a transparency signal indicates the composition ratio when an image signal corresponding to a specific object and another image signal are composited, with individual images (objects) as components of a composite image being units.

BACKGROUND OF THE INVENTION

In recent years, we have greeted the age of multimedia in which audio, video and other data are integrally handled, and the conventional information media (i.e., means for transmitting information to men), such as newspapers, magazines, televisions, radios, and telephones, have been adopted as the subjects of multimedia. Generally, "multimedia" means to represent, not only characters, but also diagrams, speeches, and especially images simultaneously in relation with each other. In order to handle the conventional information media as the subjects of multimedia, it is necessary to transform the information into a digital format.

When the quantity of data possessed by each information medium described above is estimated as the quantity of digital data, in case of characters, the data quantity for each character is 1–2 byte. However, in case of speech, the data quantity is 64 kbits per second (quality for telecommunication) and, in case of moving picture, it is more than 100 Mbits per second (quality for current television broadcasting). So, as for the information media described above, it is not practical to handle such massive data as it is in the digital format. For example, although visual telephones have already been put to practical use by ISDN (Integrated Services Digital Network) having a transmission rate of 64 kbps–1.5 Mbps, it is impossible to transmit an image of a television camera as it is by the ISDN.

So, data compression technologies are demanded. In case of visual telephones, the moving picture compression technologies standardized as H.261 and H.263 by ITU-T (International Telecommunication Union-Telecommunication Sector) are employed. Further, according to the data compression technology based on MPEG1, it is possible to record image data, together with audio data, in an ordinary music CD (compact disk).

MPEG (Moving Picture Experts Group) is an international standard of data compression for data of a moving picture (an image signal of a moving picture). In MPEG1, data of a moving picture is compressed to 1.5 Mbps, i.e., data of a television signal is compressed to about 1/100. Since the transmission rate to which MPEG1 is directed is limited to about 1.5 Mbps, MPEG2 is standardized to meet the demand for higher image quality. In MPEG2, data of a moving picture is compressed to 2–15 Mbps. Under the existing circumstances, standardization of MPEG4 is now proceeded by the working group for standardization of MPEG1 and MPEG2 (ISO/IEC JTC1/SC29/WG11). MPEG4 enables coding and signal processing in object units, and thereby realizes new functions required in the age of multimedia. MPEG4 has originally aimed at standardization of a coding method at a low bit rate, but the aim of standardization is now extended to a more versatile coding process at a high bit rate adaptable to an interlaced image.

In MPEG4, display of a composite image based on a coded image signal obtained by coding an image signal in object units, is realized by the following processes: decoding coded image signals corresponding to predetermined objects to generate decoded image signals; compositing the decoded image signals corresponding to the predetermined objects to generate a composite image signal; and reproducing the composite image on a screen, such as a monitor, based on the composite image signal.

The image composition process (the process of compositing the decoded image signals) is to superpose image signals corresponding to a foreground image which is an image of an object to be composited (target image) and a background image such that the foreground image lies on the background image when displayed.

To be specific, a color signal corresponding to the foreground image and a color signal corresponding to the background image are added at a predetermined weighting ratio, thereby obtaining a color signal corresponding to a composite image. The weighting ratio of the color signal of the foreground image is the transparency of the foreground image. A transparency signal of the foreground image is composed of transparency values of pixels composing the foreground image. A color signal is composed of a luminance signal and a chrominance signal. The luminance signal includes brightness information indicating the brightness of each of pixels composing the foreground image or the background image. The chrominance signal includes color information indicating the color (tone) of each of pixels composing the foreground image or the background image.

Further, in MPEG4, the transparency value is expressed by a numerical value of 8 bits. That is, the transparency value of a completely transparent pixel is "0", and the transparency value of a completely opaque pixel is "255". The transparency is expressed in $2^8$ ways (256 gradations).

The value of each pixel (pixel value) of the color signal corresponding to the composite image is represented by formula (1).

$$Ycom=(255-Gfg) \times Ybg+Gfg \times Yfg \quad (1)$$

where Ybg is the pixel value of the background image, Yfg is the pixel value of the target (foreground) image, Gfg is the transparency value of the target image, and Ycom is the pixel value of the composite image.

By the way, in an object image signal produced by chromakey in a broadcast studio or the like, its pixel value Yfg has already been multiplied by the transparency value Gfg in many cases. Such a pixel value of the target image is expressed by Y'fg. Since $Y'fg=Gfg \times Yfg$, the pixel value Ycom of the composite image is defined by formula (2).

$$Ycom=(255-Gfg)Ybg+Y'fg \quad (2)$$

Hereinafter, the process of displaying a composite image will be schematically explained by using FIGS. 7(a)–7(e), 8(a)–8(d), and 9(a)–9(d).

FIG. 7(a) shows an image space Sb including a background image Tb obtained from a color signal of a background, and FIGS. 7(b) and 7(d) show image spaces Sf1 and Sf2 including first and second target images Tf1 and Tf2 obtained from color signals of first and second foregrounds, respectively. Further, FIGS. 7(c) and 7(e) show image spaces Sg1 and Sg2 including first and second target images Gf1 and Gf2 obtained from transparency signals of the first and second foregrounds, respectively.

FIG. 8(d) shows an image space Sc13 including a composite image Tc13 obtained by compositing the first target image Tf1 (FIG. 7(b)) and the background image Tb (FIG. 7(a)) according to formula (1) or (2), and FIG. 9(d) shows an image space Sc23 including a composite image Tc23 obtained by compositing the second target image Tf2 (FIG. 7(d)) and the background image Tb (FIG. 7(a)) according to formula (1) or (2).

In MPEG4, coding and decoding of a transparency signal is performed object by object, by referring to a shape signal indicating whether each pixel value corresponds to a pixel positioned inside the object (hereinafter, referred to as an inside-object pixel) or a pixel positioned outside the object (hereinafter, referred to as an outside-object pixel). Further, coding and decoding of a transparency signal corresponding to each object are performed in units of rectangle regions (macroblocks) each comprising 16×16 pixels, into which an object region including the object is divided. The object is equivalent to a unit called "VOP" (Video Object Plane), which corresponds to a frame handled in MPEG1 or 2. A VOP is a region comprising pixels included in an object in a frame, and the above-mentioned object region is a region enclosing the VOP.

To be specific, coding of a transparency signal corresponding to a target macroblock to be processed is performed in any of the following three modes (Modes 1–3) according to a shape signal.

(1) Mode 1: the target macroblock is positioned completely outside the object (VOP).

Since the transparency values of outside-object pixels (outside-VOP pixels) are "0", in this case, coding of the transparency signal of the target macroblock is omitted, and only a mode identification signal (coding mode signal) indicating that all the transparency values of the pixels included in the target macroblock are "0", is coded.

(2) Mode 2: at least a part of the target macroblock is positioned inside the object, and all the inside-object pixels (inside-VOP pixels) included in the target macroblock have the transparency value "255".

In this case, since the transparency values of the inside-object pixels are "255", only a mode identification signal (coding mode signal) indicating that the transparency values of all the inside-object pixels included in the target macroblock are "255", is coded. Accordingly, coding of the transparency signal corresponding to the target macroblock is omitted.

(3) Mode 3: the situation is other than the above-mentioned cases (1) and (2), i.e., at least a part of the target macroblock is positioned inside the object and at least one inside-object pixel (inside-VOP pixel) whose transparency value is other than "255" is present in the target macroblock.

In this case, the transparency signal corresponding to the target macroblock is subjected to waveform coding. Further, a mode identification signal (coding mode signal) indicating that the transparency values of the respective pixels of the transparency signal are coded, is coded. Then, transparency data, which includes a coded mode signal obtained by coding the coding mode signal and a coded transparency signal obtained by waveform-coding the values corresponding to the respective pixels of the transparency signal, are transmitted from the coding end to the decoding end.

As for the coding mode of the transparency signal corresponding to the macroblock, the frequencies of occurrence of Mode 1 and Mode 2 are especially high and, therefore, the coding mode signal (mode identification signal) indicating Mode 1 or Mode 2 is given a code of a short code length and subjected to variable-length coding, whereby the coding efficiency of the transparency signal is significantly improved.

By the way, in the process of image edition, fade-in and fade-out are well used for visual effects. In the image composition process or the like, fade-in is a technique to make a foreground image appear gradually on a background image, and fade-out is a technique to make the foreground image on the background image disappear gradually. Hereinafter, these techniques are also referred to as "a fade-in/fade-out technique".

For example, FIGS. 8(a)–8(d) illustrate the case where the first target image Tf1 gradually appears on the background image Tb by fade-in, in the image composition process.

To be specific, in the image space Sc10 including the composite image Tc10 shown in FIG. 8(a), the first target image Tf1 scarcely appears on the background image Tb. In the composite image Sc11 including the composite image Tc11 shown in FIG. 8(b), the first target image Tf1 slightly appears on the background image Tb. In this state, in the portion where the background image Tb and the first target image Tf1 overlap, the background image Tb is thicker than the first target image Tf1. In the image space Sc12 including the composite image Tc12 shown in FIG. 8(c), the first target image Tf1 appears more clearly on the background image Tb than in FIG. 8(b). In this state, in the portion where the background image Tb and the first target image Tf1 overlap, the first target image Tf1 is thicker than the background image Tb. In the image space Sc13 including the composite image Tc13 shown in FIG. 8(d), the first target image Tf1 displayed on the background image Tb is opaque. In this state, the portion of the background image Tb overlapping with the first target image Tf1 is completely hidden by the target image Tf1.

FIGS. 9(a)–9(d) illustrate the case where the second target image Tf2 gradually appears on the background image Tb by fade-in in the image composition process.

To be specific, in the image space Sc20 including the composite image Tc20 shown in FIG. 9(a), the second target image Tf2 scarcely appears on the background image Tb. In the composite image Sc21 including the composite image Tc21 shown in FIG. 9(b), the second target image Tf2 slightly appears on the background image Tb. In this state, in the portion where the background image Tb and the second target image Tf2 overlap, the background image Tb is thicker than the second target image Tf2. In the image space Sc22 including the composite image Tc22 shown in FIG. 9(c), the second target image Tf2 appears more clearly on the background image Tb than in FIG. 9(b). In this state, in the portion where the background image Tb and the second target image Tf2 overlap, the second target image Tf2 is thicker than the background image Tb. In the image space Sc23 including the composite image Tc23 shown in FIG. 9(d), the second target image Tf2 displayed on the background image Tb is opaque. In this state, the portion of the background image Tb overlapping with the second target image Tf2 is completely hidden by the target image Tf2.

As described above, in many cases, the transparency signal corresponding to each pixel of the target image takes, as its value, either "0" (transparent) indicating that the pixel is positioned outside the object or "255" (opaque) indicating that the pixel is positioned inside the object. That is, the frequency of occurrence of intermediate values between "0" and "255", which indicate "semi-transparent", is low.

However, when fade-in or fade-out is used, the inside-object pixels take such transparency values indicating "semi-transparent". Therefore, the statistical property of the transparency signal in the case of using the fade-in/fade-out technique in the image composition process is considerably different from that in the case of using no fade-in/fade-out technique.

When displaying a composite image, usually, the frequency of occurrence of a macroblock which has a portion positioned inside the object and the transparency values of all the inside-object pixels being "255", is high. On the other hand, when face-in or fade-out is used when displaying a composite image and thereby the transparency values of the inside-object pixels constituting the target image are multiplied by A, the frequency of occurrence of a macroblock which has a portion inside the object and the transparency values of all the inside-object pixels being "255×A", is high.

So, in MPEG4, the concept of "constant alpha value" is introduced, and the object for standardization includes an extended coding method for a transparency signal, in which the constant alpha value can be transmitted or changed in units corresponding to frames in MPEG1 or MPEG2.

As described above, a VOP is a region comprising inside-object pixels composing one frame (image of one frame) and, therefore, being inside the object is equivalent to being inside the VOP. Further, since the transparency values of the outside-VOP pixels in the target macroblock are regarded as "0", it is only needed in the coding process of Mode 2 to consider only the transparency values of the inside-VOP pixels in the target macroblock.

Hereinafter, a description is given of the extended coding method for a transparency signal.

(1) Mode 1: the target macroblock is positioned completely outside the VOP.

Since the transparency values of pixels positioned outside the VOP are "0", coding of the transparency signal is omitted in this case. Only a mode identification signal (coding mode signal) which indicates that all the transparency values of the pixels included in the target macroblock are "0", is coded.

(2) Mode 2: at least a part of the target macroblock is positioned inside the object, and all the inside-object pixels (inside-VOP pixels) included in the target macroblock have the transparency value "255×A".

In this case, since the transparency values of the inside-object pixels are "255×A", only a mode identification signal (coding mode signal) which indicates that all the transparency values of the inside-object pixels included in the target macroblock are "255×A", is coded. Accordingly, coding of the transparency signal of the target macroblock is omitted.

(3) Mode 3: the situation is other than the above-mentioned cases (1) and (2), i.e., at least a part of the target macroblock is positioned inside the object, and at least one inside-object pixel (inside-VOP pixel) whose transparency value is other than "255×A" is present in the target macroblock.

In this case, the transparency signal of the target macroblock is subjected to waveform coding. Further, a mode identification signal (coding mode signal) which indicates that the transparency values of the respective pixels of the transparency signal are coded, is coded. Then, transparency data, which includes a coded mode signal obtained by coding the coding mode signal and a coded transparency signal obtained by waveform-coding the values corresponding to the respective pixels of the transparency signal, are transmitted from the coding end to the decoding end.

In the extended coding method having the three modes described above, when coding the transparency value of each pixel, intra-frame/inter-frame adaptive DCT coding is carried out. Further, since the frequencies of occurrence of Mode 1 and Mode 2 are especially high, the mode identification signal (coding mode signal) indicating Mode 1 or Mode 2 is given a code of a short code length.

FIG. 10 is a block diagram illustrating a transparency coding apparatus for coding a transparency signal, as a conventional image processing apparatus. Since coding of a transparency signal is closely related with coding of a shape signal, FIG. 10 shows not only the transparency coding apparatus but also a shape coding apparatus.

The shape coding apparatus 200a1 comprises a blocking unit 10 and an encoder 11. The blocking unit 10 divides a shape signal Sk applied to an input terminal 1 into signals corresponding to macroblocks each comprising 16×16 pixels, and outputs a blocked shape signal Bk. The encoder 11 encodes the output Bk of the blocking unit 10 and outputs a coded shape signal Ck from an output terminal 3.

The transparency coding apparatus 200a2 includes a maximum value detector 20 and an encoder 21. The maximum value detector 20 receives a transparency signal Sg corresponding to a specific VOP applied to an input terminal 2, and detects a maximum value Sgm of transparency in the VOP. The encoder 21 encodes the maximum transparency value Sgm to output coded maximum value data Cgm from an output terminal 4.

Further, the transparency coding apparatus 200a2 includes a blocking unit 22 and an intra/inter-frame encoder 32. The blocking unit 22 divides the transparency signal Sg into signals corresponding to macroblocks each comprising 16×16 pixels, to output a blocked transparency signal Bg. The encoder 32 subjects the output Bg of the blocking unit 22 to adaptive coding, and outputs a coded transparency signal Cg and a locally decoded transparency signal Ldg3 of the blocked transparency signal Bg.

Further, the transparency coding apparatus 200a2 includes a mode decision unit 23 and an encoder 26. The mode decision unit 23 decides a coding mode, according to the maximum transparency value Sgm, the blocked transparency signal Bg, and the blocked shape signal Bk, to output a mode decision output (coding mode signal) Mo. The encoder 26 encodes the mode decision output Mo to output a coded mode signal CMo from an output terminal 5.

Furthermore, the transparency coding apparatus 200a2 includes, in addition to the intra/inter-frame encoder 32 adapted to Mode 3, an outside-VOP encoder 30 adapted to Mode 1 and a fixed-value encoder 31 adapted to Mode 2. The outside-VOP encoder 30 does not output a coded transparency signal obtained by coding a transparency signal whose value is "0", but outputs only a locally decoded transparency signal Ldg1 of the transparency signal. The fixed-value encoder 31 does not output a coded transparency signal obtained by coding a transparency signal whose value is "255×A", but outputs only a locally decoded transparency signal Ldg2 of the transparency signal.

Moreover, the transparency coding apparatus 200a2 includes an ON/OFF switch 33 and a selector switch 25. The ON/OFF switch 33 is disposed between the encoder 32 and the output terminal 6, and controlled by the output Mo of the mode decision unit 23. The selector switch 25 selects one of the locally decoded signals Ldg1–Ldg3, according to the output Mo of the mode decision unit 23.

The transparency coding apparatus 200a2 further includes a memory 34 which stores the locally decoded signal Ldg selected by the selector switch 25. The adaptive coding of the transparency signal by the intra/inter-frame encoder 32 is carried out by referring to the locally decoded signal Ldg stored in the memory 34. The adaptive coding is a coding process in which the coding mode is adaptively switched between intra-frame coding utilizing correlation of pixels in a frame and inter-frame coding utilizing correlation of pixels between frames.

A description is now given of the operation.

The shape signal Sk applied to the input terminal 1 of the shape coding apparatus 200a1 is blocked into signals corresponding to macroblocks each comprising 16×16 pixels, by the blocking unit 10. The blocked shape signal Bk is coded by the encoder 11, whereby the coded shape signal Ck is output from the output terminal 3 to the outside.

On the other hand, the transparency signal Sg applied to the input terminal 1 of the transparency coding apparatus 200a2 is input to the maximum value detector 20, wherein the maximum value Sgm of transparency in the VOP is detected, based on the transparency signal Sg. This maximum value Sgm is coded by the encoder 21, and the coded maximum value is output as a coded signal Cgm from the output terminal 4 to the outside.

The detected maximum value Sgm of transparency in the VOP corresponds to the fixed transparency value "255×A" in the coding method based on MPEG4. As for the fixed transparency value "255×A", only one value is coded for one VOP.

Further, the transparency signal Sg is blocked into signals corresponding to macroblocks each comprising 16×16 pixels, by the blocking unit 22. The blocked transparency signal Bg is output to the mode decision unit 23 and the intra/inter-frame encoder 32.

In the mode decision unit 23, the coding mode for coding the transparency signal is decided, based on the output (blocked shape signal) Bk of the blocking unit 10 in the shape coding apparatus 200a1, the output Sgm of the maximum value detector 20, and the output (blocked transparency signal) Bg of the blocking unit 22.

To be specific, when the mode decision unit 23 decides that the target macroblock to be processed is positioned outside the VOP, the mode decision unit 23 outputs the coding mode signal Mo indicating Mode 1. When the transparency values of all the inside-VOP pixels included in the output Bk of the blocking unit 22 agree with the maximum value Sgm output from the maximum value detector 20, the mode decision unit 23 outputs the coding mode signal Mo indicating Mode 2. In the case other than mentioned above, the mode decision unit 23 outputs the coding mode signal Mo indicating Mode 3.

The coding mode signal Mo output from the mode decision unit 23 is encoded by the encoder 26 to be output as the coded mode signal CMo from the output terminal 5.

The selector switch 25 selects one of the three outputs (locally decoded transparency signals) Ldg1–Ldg3 of the encoders 30–32, according to the mode decision output (coding mode signal) Mo from the mode decision unit 23.

To be specific, any of the three coding modes in the extended coding method is selected as follows.

(1) When the coding mode is Mode 1, the outside-VOP encoder 30 is selected, which encoder does not output any coded transparency signal but outputs only a locally decoded transparency signal corresponding to the transparency value "0".

(2) When the coding mode is Mode 2, the fixed-value encoder 31 is selected, which encoder does not output any coded transparency signal but outputs only a locally decoded transparency signal corresponding to the transparency value "255×A".

(3) When the coding mode is Mode 3, the intra/inter-frame encoder 32 is selected, which encoder outputs an intra-frame or inter-frame coded transparency signal and its locally decoded transparency signal.

In order to encode only the transparency values of the inside-VOP pixels and output the transparency values of the outside-VOP pixels as "0", the fixed-value encoder 31 and the intra/inter-frame encoder 32 refer to the shape signal output from the blocking unit 10, as needed.

The locally decoded transparency signal Ldg from the encoder selected by the selector switch 25 is temporarily stored in the memory 34 so that the intra/inter-frame encoder 32 can refer to the signal as needed. Further, when the mode decision output (coding mode signal) Mo from the mode decision unit 23 indicates Mode 3, the ON/OFF switch 33 is set to the ON state, whereby the coded transparency data Cg generated in the intra/inter-frame encoder 32 is output from the output terminal 6. When the mode decision output Mo from the mode decision unit 23 indicates Mode 1 or Mode 2, the ON/OFF switch 33 is set to the OFF state, whereby the output of the intra/inter-frame encoder 32 is not output.

Through the above-described processes, the coded shape signal Ck obtained by coding the shape signal Sg is output from the shape coding apparatus 200a1, and the coded mode signal CMo, the coded maximum value data Cgm, and the coded transparency signal Cg are output, as coded transparency data, from the transparency coding apparatus 200a2.

FIG. 11 is a block diagram illustrating a transparency decoding apparatus for decoding a coded transparency signal, as a conventional image processing apparatus. Since decoding of a coded transparency signal is closely related with decoding of a coded shape signal, FIG. 11 shows a shape decoding apparatus as well as the transparency decoding apparatus. In FIG. 11, the same signals as those shown in FIG. 10 are given the same reference numerals.

The shape decoding apparatus 200b1 decodes the coded shape signal Ck which has been obtained by coding the shape signal Sk in the shape coding apparatus 200a1 shown in FIG. 10. Further, the transparency decoding apparatus 200b2 decodes the coded transparency signal Cg which has been obtained by coding the transparency signal Sg in the transparency coding apparatus 200a2 shown in FIG. 10.

To be specific, the shape decoding apparatus 200b1 comprises a decoder 40 and a de-blocking unit 41. The decoder 40 decodes the coded shape signal Ck output from the shape coding apparatus 200a1 to generate a decoded shape signal Dk. The de-blocking unit 41 integrates the decoded shape signals Dk to generate a reproduced shape signal Rk corresponding to an object region comprising a plurality of macroblocks.

The transparency decoding apparatus 200b2 includes decoders 42 and 45. The decoder 42 decodes the coded mode signal CMo from the transparency coding apparatus 200a by referring to the decoded shape signal Dk from the decoder 40. The decoder 45 decodes the coded maximum value data Cgm from the transparency coding apparatus 200a2 to generate decoded maximum value data Dgm.

Based on the decoded shape signal Dk, when the target macroblock to be processed is not outside the VOP, the decoder 42 decodes the coded mode signal CMo to output a coding mode signal Mo. On the other hand, when the target macroblock is outside the VOP, the decoder 42 outputs a coding mode signal Mo indicating Mode 1. The decoder 45 decodes the coded maximum value data Cgm to output "255×A" which corresponds to the maximum value of the transparency signal, as decoded maximum value data Dgm.

Further, the transparency decoding apparatus 200b2 includes an outside-VOP decoder 50 adapted to Mode 1, a fixed-value decoder 51 adapted to Mode 2, and an intra/inter-frame decoder 52 adapted to Mode 3.

The outside-VOP decoder 50 outputs the transparency value "0" as a decoded transparency signal. The fixed-value decoder 51 outputs the transparency value "255×A" for the inside-VOP pixels, and the transparency value "0" for the outside-VOP pixels, as the decoded transparency signal, based on the decoded shape signal Dk and the decoded maximum value data Dgm. The intra/inter-frame decoder 52 subjects the coded transparency signal Cg from the transparency coding apparatus 200a1 to intra-frame decoding or inter-frame decoding, to output a decoded transparency signal Dg. For the outside-VOP pixels, the decoder 52 outputs the transparency value "0" as the decoded transparency signal.

The transparency decoding apparatus 200b2 further includes an ON/OFF switch 43 and a selector switch 44. The ON/OFF switch is connected between the input terminal 8 and the intra/inter-frame decoder 52, and controlled by the decoded coding mode signal Mo. The selector switch 44 selects one of the outputs Dg1–Dg3 from the decoders 50–52, based on the decoded coding mode signal Mo, and output it as the decoded transparency signal Dg corresponding to the target macroblock.

Further, the transparency decoding apparatus 200b2 includes a de-blocking unit 54 and a memory 53. The de-blocking unit 54 integrates the decoded transparency signals Dg corresponding to the respective macroblocks to generate a reproduced transparency signal Rg corresponding to the object region. The memory 53 temporarily stores the output Dg from the selector switch 44. The decoded transparency data MDg stored in the memory 53 are referred to by the intra/inter-frame decoder 52 as needed.

A description is now given of the operation.

When the coded shape signal Ck output from the shape coding apparatus 200a1 is input to the shape decoding apparatus 200b1 through the input terminal 7, the coded shape signal Ck is decoded by the decoder 40, and a decoded shape signal Dk for each macroblock is output from the decoder 40. The decoded shape signals Dk are integrated to generate a reproduced shape signal Rk corresponding to a specific object region comprising a plurality of macroblocks by the de-blocking unit 41, and then the signal Rk is output from the de-blocking unit 41.

On the other hand, when the coded mode signal CMo from the transparency coding apparatus 200a2 is input to the transparency decoding apparatus 200b2 through the input terminal 9, decoding of the coded mode signal CMo is performed in the decoder 42, by referring to the decoded shape signal Dk from the decoder 40 in the shape decoding apparatus 200b1. When the target macroblock is not an outside-VOP block (a block positioned outside the VOP), the decoder 42 decodes the coded mode signal CMo to output a coding mode signal Mo. When the target macroblock is an outside-VOP block, the decoder 42 outputs a coding mode signal Mo indicating Mode 1.

Further, the coded maximum value data Cgm supplied from the transparency coding apparatus 200a2 to the input terminal 10 of the transparency decoding apparatus 200b2, is decoded by the decoder 45, and decoded maximum value data Dgm is output from the decoder 45. The decoded maximum value data Dgm indicates the maximum value "255×A" of the transparency signal.

Further, the ON/OFF switch 43 and the selector switch 44 are controlled by the coding mode signal Mo output from the decoder 42, whereby a decoded transparency signal Dg according to the coding mode is generated.

To be specific, when the coding mode signal Mo obtained by decoding the coded mode signal CMo indicates Mode 1 or 2, the ON/OFF switch 43 is set to the OFF state. In this state, from the outside-VOP decoder 50 adapted to Mode 1, the transparency value "0" is output as a decoded transparency signal Dg1. From the fixed-value decoder 51 adapted to Mode 2, as a decoded transparency signal Dg2, the transparency value "255×A" is output as for the inside-VOP pixels while the transparency value "0" is output as for the outside-VOP pixels. When the coding mode signal indicates Mode 1, the selector switch 44 selects the output Dg1 of the outside-VOP decoder 50, and when the coding mode signal indicates Mode 2, the switch 44 selects the output Dg2 of the fixed-value decoder 51.

On the other hand, when the coding mode signal obtained by decoding the coded mode signal indicates Mode 3, the ON/OFF switch 43 is set to the ON state. Thereby, the coded transparency signal Cg from the transparency coding apparatus 200a2 is input to the intra/inter-frame decoder 52 adapted to Mode 3. In the intra/inter-frame decoder 52, the output (coded transparency data) Cg of the ON/OFF switch 43 is subjected to intra-frame coding or inter-frame coding, whereby a decoded transparency signal Dg3 is output. From the decoder 52, "0" is output as the transparency value of the outside-VOP pixels. Further, the output Dg of the selector switch 44 is temporarily stored in the memory 53 so that the intra/inter-frame decoder 52 can refer to as needed.

At this time, in the selector switch 44, the decoded transparency signal Dg3 from the decoder 52 is selected according to the coding mode, and this signal Dg3 is output as a selected signal Dg of the switch 44 to the de-blocking unit 54.

In the de-blocking unit 54, the selected signals Dg from the switch 44 are integrated to generate a reproduced transparency signal Rg corresponding to an object region comprising a plurality of macroblocks, and this signal Rg corresponding to one object is output from the output terminal 12.

As described above, since the maximum value of the transparency signal is coded in VOP units, in the situation where the transparency of the target image (object) changes uniformly due to fade-in or fade-out, the uniform transparencies of the inside-VOP pixels can be efficiently coded by utilizing the coding mode signal indicating that the transparencies of the inside-VOP pixels are uniform.

FIGS. 12(a)–12(d) are diagrams illustrating a data structure of coded data of an image signal (coded image signal) based on MPEG4.

As shown in FIG. 12(a), a coded image signal C corresponding to one VOP is composed of a VOP header Hv (common data) which is common to the entire VOP, and block data M(1), M(2), . . . , M(i−1), M(i), M(i+1), . . . , M(n−1), M(n) which correspond to macroblocks.

As shown in FIG. 12(b), the VOP header Hv includes data indicating the maximum value of transparency (maximum transparency value data) together with other common data Hva and Hvb.

On the other hand, as shown in FIG. 12(c), the block data corresponding to each macroblock is composed of a macroblock header Hmb, shape data (coded shape signal) Ck, transparency data Cgr, and color data corresponding to a luminance signal and a chrominance signal (Y data Cy, U data Cu, V data Cv).

Further, as shown in FIG. 12(d), the transparency data Cgr corresponding to each macroblock is composed of a coded mode signal CMo which is obtained by coding the coding mode signal Mo, and coded waveform data (coded transparency signal) Cg which is obtained by subjecting the transparency signal Sg to adaptive coding in the intra/inter-frame encoder 32.

By the way, in the process of editing images, the way of gradually varying the displayed image by the fade-in/fade-out technique is changed, or when compositing a plurality of images, the composition ratio of a specific image is uniformly changed. For example, an opaque object (foreground image) is composited with the background image such that the background image is seen through the foreground image.

Further, in view of reuse of the original image or reduction in storage space for data of the original image, it is desired that the original image can be handled in the state of coded data as well as the state of image data.

However, as for the coded transparency signal obtained by the conventional coding method described above, it is difficult to subject it to a process of uniformly changing the transparency.

For example, in the coded image signal (bit stream of an image signal) C having the data structure shown in FIGS. 12(a)–12(d), the transparency value of the transparency signal output from the fixed-value encoder 31 of the transparency coding apparatus 200a2 (or the fixed-value decoder 51 of the transparency decoding apparatus 200b2) can be easily changed by changing the maximum transparency value Cgm included in the VOP header Hv of this signal C. However, the transparency data in the coded transparency signal obtained by the intra/inter-frame encoder 32 (or the transparency data in the decoded transparency signal obtained by the intra/inter-frame decoder 52) cannot be changed by changing the maximum transparency value Cgm included in the VOP header Hv.

Further, when the intra/inter-frame encoder 32 (intra/inter-frame decoder 52) performs coding (decoding) with reference to already-decoded transparency signals corresponding to different VOPs, if the maximum value of transparency of the reference VOP changes, the value of the decoded transparency signal of the reference VOP, which is the output from the fixed-value encoder 31 (fixed-value decoder 51), changes as well. In this case, the encoder 32 (decoder 52) cannot perform correct coding (decoding).

SUMMARY OF THE INVENTION

The present invention is made to solve the above-described problems, and it is an object of the present invention to provide apparatuses and methods for image processing, which realize coding and decoding of a transparency signal in which transparency data included in a coded transparency signal can be easily changed in VOP units while improving coding efficiency.

It is another object of the present invention to provide a data storage medium which contains an image processing program implementing the above-mentioned coding or decoding of a transparency signal by software.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided an image processing apparatus for coding a transparency signal corresponding to an object constituting an image, which transparency signal indicates a composition ratio used when compositing an image signal corresponding to the object with another image signal. The apparatus comprises scaling value detection means for receiving a transparency signal which has been subjected to a process of changing its signal value with a fixed scale factor, and detecting a specific signal value corresponding to the fixed scale factor, as a scaling value; scaling means for performing scaling on the transparency signal whose signal value has been changed, by using the detected scaling value, and outputting a scaled transparency signal whose signal value is restored to the signal value before the change; first coding means for coding the scaling value to output coded scaling value data; blocking means for dividing the scaled transparency signal into signals corresponding to a plurality of blocks each comprising a predetermined number of pixels, and outputting a transparency signal corresponding to each block; and second coding means for coding the transparency signal corresponding to each block to output a coded transparency signal. The coded scaling value data and the coded transparency signal corresponding to each block are output as coded data of the transparency signal. Therefore, the process of uniformly changing the transparency signal in VOP units by appropriately changing the scaling value can be carried out easily and independently of the transparency signal coding process, while improving the coding efficiency of the transparency signal.

According to a second aspect of the present invention, there is provided an image processing apparatus for coding a transparency signal corresponding to an object constituting an image, which transparency signal indicates a composition ratio used when compositing an image signal corresponding to the object with another image signal. The apparatus comprises scaling means for performing scaling on a transparency signal whose signal value has been changed with a fixed scale factor, by using a scaling value which is a specific signal value corresponding to the fixed scale factor and is supplied from the outside, and outputting a scaled transparency signal whose signal value has been restored to the signal value before the change; first coding means for coding the scaling value to output coded scaling value data; blocking means for dividing the scaled transparency signal into signals corresponding to a plurality of blocks each comprising a predetermined number of pixels, and outputting a transparency signal corresponding to each block; and second coding means for coding the transparency signal corresponding to each block to output a coded transparency signal. The coded scaling value data and the coded transparency signal corresponding to each block are output as coded data of the transparency signal. Therefore, the process of uniformly changing the transparency signal in VOP units by appropriately changing the scaling value can be carried out easily and independently of the transparency signal coding process, while improving the coding efficiency of the transparency signal.

According to a third aspect of the present invention, there is provided an image processing apparatus for decoding a coded transparency signal which has been obtained by coding a transparency signal corresponding to an object constituting an image, which transparency signal indicates a composition ratio used when compositing an image signal corresponding to the object with another image signal. This apparatus comprises first decoding means for decoding first coded data included in the coded transparency signal to output a scaling value corresponding to a fixed scale factor for the value of the transparency signal of the object; second decoding means for decoding second coded data included in the coded transparency signal to output transparency signals corresponding to a plurality of blocks each comprising a predetermined number of pixels; scaling means for subjecting the transparency signals corresponding to the respective blocks to a scaling process for changing the values of the transparency signals with the fixed scale factor indicated by the scaling value, and outputting scaled transparency signals; and de-blocking means for integrating the scaled transparency signals to generate a reproduced transparency signal corresponding to an object region which includes the object and comprises a prescribed number of blocks. Therefore, even if the input coded transparency signal has been subjected to change of the scaling value in the state of the coded data, decoding of the coded transparency signal can be correctly performed by subjecting the decoded transparency signal obtained by decoding the coded transparency signal to scaling based on the changed scaling value. In other words, at the coding end, the process of uniformly changing the transparency signal in VOP units by changing the scaling value can be performed easily and independently of coding of the transparency signal, while improving the coding efficiency of the transparency signal.

According to a fourth aspect of the present invention, there is provided an image processing apparatus for decoding a coded transparency signal which has been obtained by coding a transparency signal corresponding to an object constituting an image, which transparency signal indicates a composition ratio used when compositing an image signal corresponding to the object with another image signal. This apparatus comprises first decoding means for decoding first coded data included in the coded transparency signal to output a scaling value corresponding to a fixed scale factor for the value of the transparency signal of the object; second decoding means for decoding second coded data included in the coded transparency signal to output transparency signals corresponding to a plurality of blocks each comprising a predetermined number of pixels; de-blocking means for integrating the scaled transparency signals corresponding to the respective blocks to generate a transparency signal corresponding to an object region which includes the object and comprises a prescribed number of blocks; and scaling means for subjecting the transparency signal corresponding to the object to a scaling process for changing the value of the transparency signal with the fixed scale factor indicated by the scaling value, and outputting a reproduced transparency signal. Therefore, even if the input coded transparency signal has been subjected to change of the scaling value in the state of the coded data, decoding of the coded transparency signal can be correctly performed by subjecting the decoded transparency signal obtained by decoding the coded transparency signal to scaling based on the changed scaling value. In other words, at the coding end, the process of uniformly changing the transparency signal in VOP units by changing the scaling value can be performed easily and independently of coding of the transparency signal, while improving the coding efficiency of the transparency signal.

According to a fifth aspect of the present invention, there is provided an image processing method for coding a transparency signal corresponding to an object constituting an image, which transparency signal indicates a composition ratio used when compositing an image signal corresponding to the object with another image signal. This method comprises the steps of: based on a transparency signal which has been subjected to a process of changing its signal value with a fixed scale factor, detecting a specific signal value corresponding to the fixed scale factor, as a scaling value; coding the detected scaling value to generate coded scaling value data; performing scaling on the transparency signal whose signal value has been changed, by using the detected scaling value, to generate a scaled transparency signal whose signal value is restored to the signal value before the change; coding the scaled transparency signal block by block, each block comprising a predetermined number of pixels, to generate a coded transparency signal; and outputting the coded scaling value data and the coded transparency signal corresponding to each block, as coded data of the transparency signal. Therefore, the process of uniformly changing the transparency signal in VOP units by appropriately changing the scaling value can be carried out easily and independently of the transparency signal coding process, while improving the coding efficiency of the transparency signal.

According to a sixth aspect of the present invention, there is provided an image processing method for coding a transparency signal corresponding to an object constituting an image, which transparency signal indicates a composition ratio used when compositing an image signal corresponding to the object with another image signal. This method comprises the steps of: performing scaling on a transparency signal whose signal value has been changed with a fixed scale factor, by using a scaling value which is a specific signal value corresponding to the fixed scale factor and is supplied from the outside, to generate a scaled transparency signal whose signal value is restored to the signal value before the change; coding the scaling value to generate coded scaling value data; coding the scaled transparency signal block by block, each block comprising a predetermined number of pixels, to generate a coded transparency signal; and outputting the coded scaling value data and the coded transparency signal corresponding to each block, as coded data of the transparency signal. Therefore, the process of uniformly changing the transparency signal in VOP units by appropriately changing the scaling value can be carried out easily and independently of the transparency signal coding process, while improving the coding efficiency of the transparency signal.

According to a seventh aspect of the present invention, there is provided an image processing method for decoding a coded transparency signal which has been obtained by coding a transparency signal corresponding to an object constituting an image, which transparency signal indicates a composition ratio used when compositing an image signal corresponding to the object with another image signal. This method comprises the steps of: decoding first coded data included in the coded transparency signal to generate a scaling value corresponding to a fixed scale factor for the value of the transparency signal of the object; decoding second coded data included in the coded transparency signal to generate a transparency signal corresponding to a block comprising a predetermined number of pixels; subjecting the transparency signal corresponding to the block to a scaling process for changing its value with the fixed scale factor indicated by the scaling value, to generate a scaled transparency signal; and reproducing the scaled transparency signal as a transparency signal whose value has been changed with the fixed scale factor. Therefore, even if the input coded transparency signal has been subjected to change of the scaling value in the state of the coded data, decoding of the coded transparency signal can be correctly performed by subjecting the decoded transparency signal obtained by decoding the coded transparency signal to scaling based on the changed scaling value. In other words, at the coding end, the process of uniformly changing the transparency signal in VOP units by changing the scaling value can be performed easily and independently of coding of the transparency signal, while improving the coding efficiency of the transparency signal.

According to an eighth aspect of the present invention, there is provided a data structure for transmitting a coded image signal which has been obtained by coding an image signal including a transparency signal corresponding to an object constituting an image, which transparency signal indicates a composition ratio used when compositing the image signal corresponding to the object with another image signal. In this data structure, coded image signals corresponding to a plurality objects are successively arranged in object units; a coded image signal corresponding each object includes header information corresponding to the object, and macroblock data corresponding to a plurality of macroblocks into which an object region including the object is divided, each of the macroblocks comprising a predetermined number of pixels, and the macroblock data following the header information; the header information includes scaling information indicating a fixed scale factor used when changing the signal value of the transparency signal; and each macroblock data includes a scaled transparency signal which is obtained by subjecting the transparency signal whose signal value has been changed with the fixed scale factor, to scaling based on the scaling information, thereby restoring the signal value to the signal value before the change. Therefore, in an apparatus for editing the coded image signal, the scaling value of the transparency signal is edited in the state of the corresponding coded signal, whereby the transparency value of the transparency signal can be uniformly changed.

According to a ninth aspect of the present invention, there is provided a data storage medium containing an image processing program, wherein the image processing program is a coding program for making a computer perform a transparency signal coding process according to any of the above-mentioned image processing methods. Therefore, it is possible to implement a transparency coding process in which the transparency value of a transparency signal indicating the composition ratio of an image signal can be easily changed in VOP units while improving the coding efficiency of the transparency signal, and a transparency decoding process in which a coded transparency signal whose transparency value is uniformly changed in VOP units can be correctly decoded.

BRIEF DESCRIPTION OF THE DRAWINGS

FIGS. 5(a)–5(d) are diagrams for explaining a data structure of a coded image signal which is output from the image processing apparatus of the first embodiment.

FIG. 12 is a diagram illustrating a data structure of a coded image signal output from the conventional image processing apparatus.

DETAILED DESCRIPTION OF THE PREFERRED EMBODIMENTS

Hereinafter, embodiments of the present invention will be described.

Embodiment 1

Figure 1:
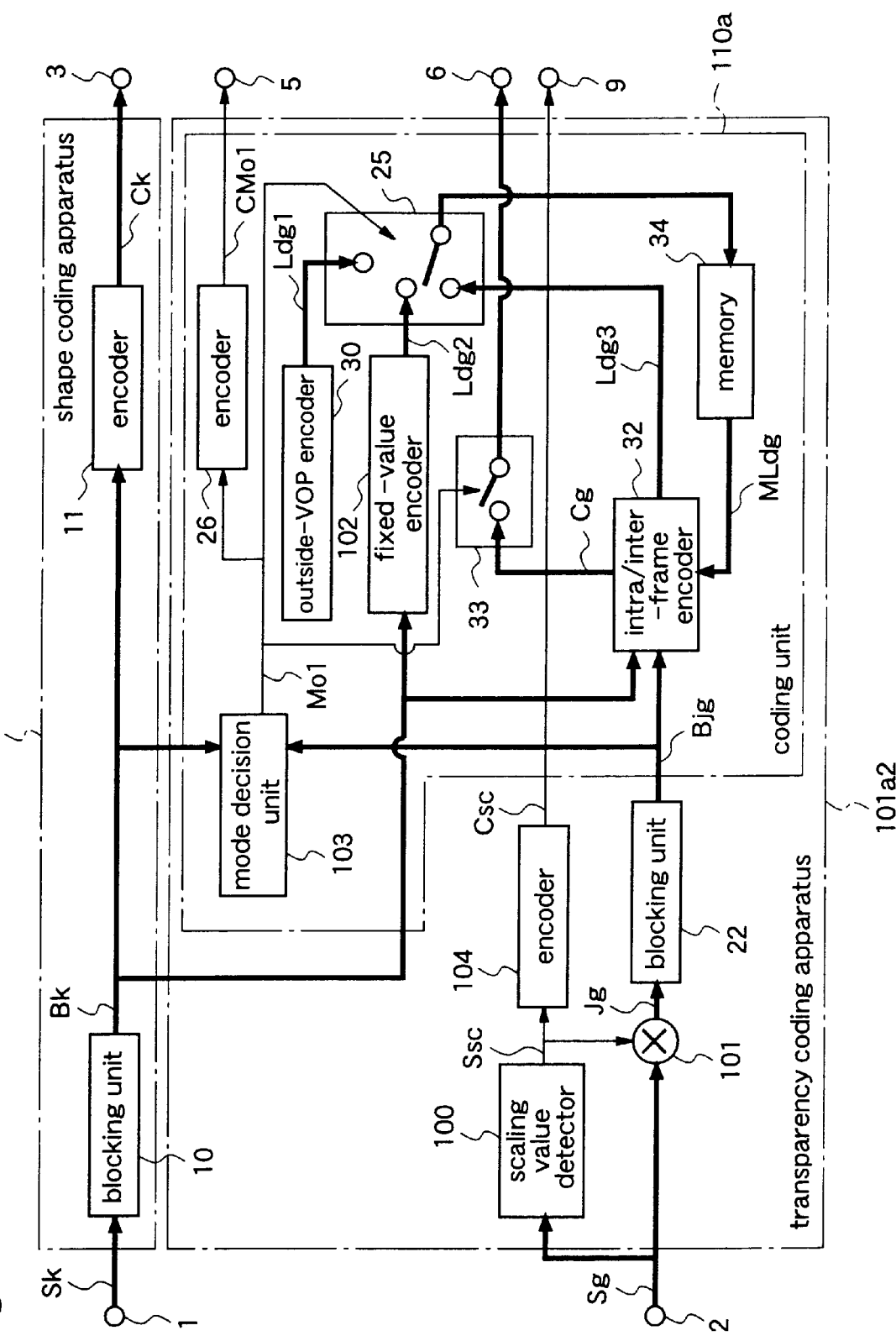
FIG. 1 is a block diagram for explaining an image processing apparatus according to a first embodiment of the present invention, illustrating a transparency coding apparatus and a shape coding apparatus which are constituents of the image processing apparatus.

FIG. 1 is a block diagram for explaining an image processing apparatus according to a first embodiment of the present invention, illustrating a transparency coding apparatus included in the image processing apparatus. Since coding of a transparency signal is closely related with a shape signal, FIG. 1 shows a shape coding apparatus as a constituent of the image processing apparatus, together with the transparency coding apparatus.

Figure 10:
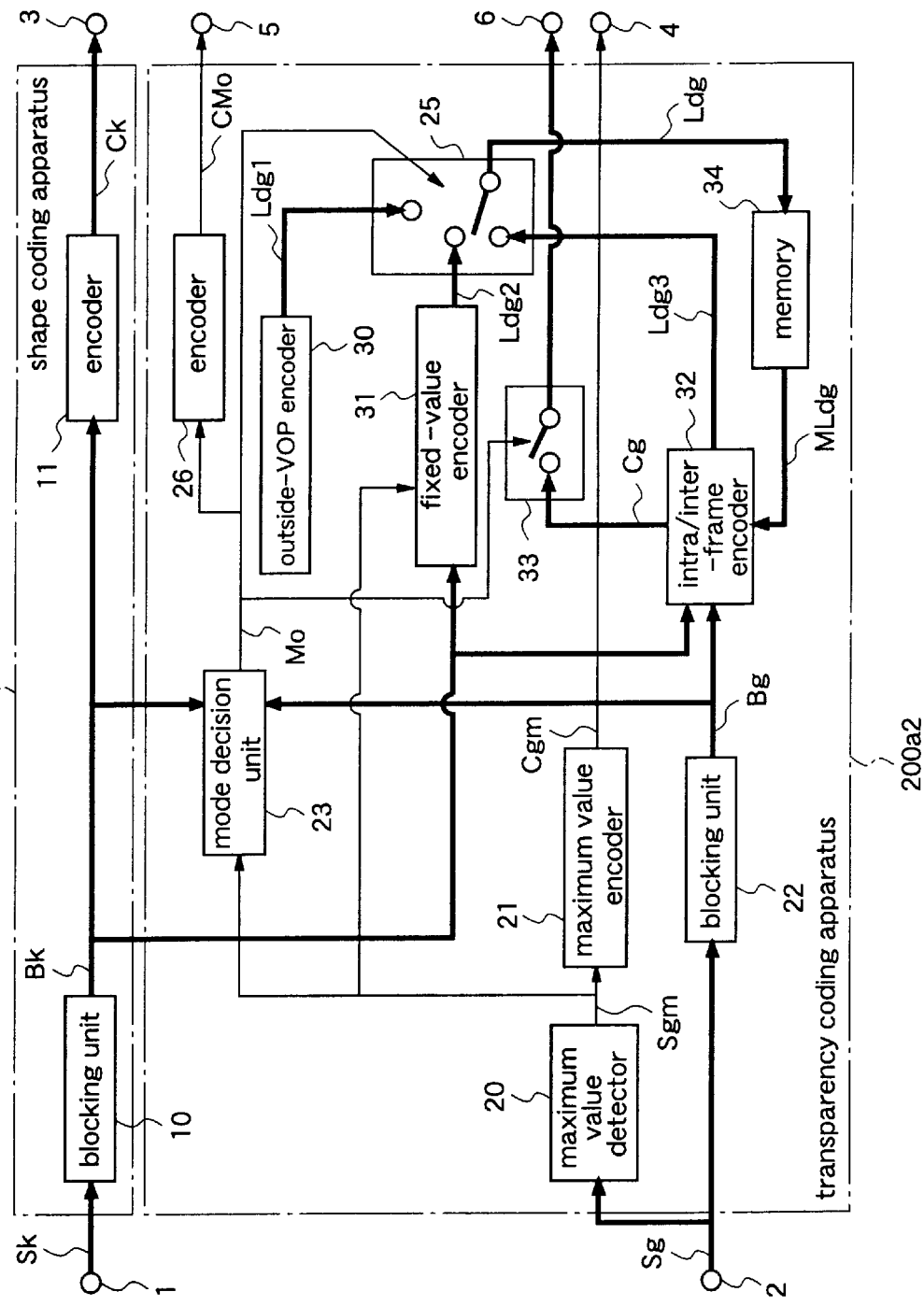
FIG. 10 is a block diagram for explaining a conventional image processing apparatus, illustrating a transparency coding apparatus and a shape coding apparatus which are constituents of the image processing apparatus.

The shape coding apparatus 101a1 according to this first embodiment comprises a blocking unit 10 which blocks a shape signal Sk applied to an input terminal 1, and an encoder 11 which encodes the output (blocked shape signal) Bk of the blocking unit 10 for each macroblock to output a coded shape signal Ck, like the conventional shape coding apparatus 200a1 shown in FIG. 10.

The transparency coding apparatus 101a2 according to this first embodiment includes a scaling value detector 100 and a scaling unit 101, instead of the maximum value detector 20 of the conventional transparency coding apparatus 200a2 shown in FIG. 10. The scaling value detector 100 detects a scaling value Ssc relating to a transparency signal, based on a transparency signal Sg applied to an input terminal 2. The scaling unit 101 subjects the input transparency signal Sg to predetermined multiplication, based on the scaling value Ssc.

The scaling value corresponds to a scale factor for the transparency value of the transparency signal, and indicates the ratio in which the original transparency value is changed to obtain the input transparency signal Sg. For example, in the above-mentioned fade-in or fade-out process, the transparency signal of a specific object is changed so as to have a transparency value which is a fixed multiple of the original transparency value and, thereafter, input to the transparency coding apparatus.

Further, the transparency coding apparatus 101a2 includes an encoder 104 which encodes the scaling value Ssc to output coded data (coded scaling data) Csc of the scaling value, instead of the encoder 21 for encoding the maximum transparency value Sgm in the transparency coding apparatus 200a2 shown in FIG. 10.

Other constituents of the transparency coding apparatus 101a2 are fundamentally identical to those of the transparency coding apparatus 200a shown in FIG. 10. That is, the transparency coding apparatus 101a2 includes a blocking unit 22, a mode decision unit 103, a mode encoder 26, an outside-VOP encoder 30, a fixed-value encoder 102, an intra/inter-frame encoder 32, a memory 34, a selector switch 25, and an ON/OFF switch 33.

However, in the transparency coding apparatus 101a2, the blocking unit 22 blocks the output Jg of the scaling unit 101 to output a blocked transparency signal Bjg. The mode decision unit 103 performs mode decision, based on the blocked shape signal Bk and the blocked transparency signal Bjg, without referring to the maximum transparency value of the VOP. Further, the fixed-value encoder 102 outputs a locally decoded transparency signal Ldg2 whose transparency value is fixed, based on the blocked shape signal Bk, without referring to the maximum transparency value of the VOP.

In the transparency coding apparatus 101a2, a coding unit 110a comprises the mode decision unit 103, the mode encoder 26, the outside-VOP encoder 30, the fixed-value encoder 102, the intra/inter-frame encoder 32, the memory 34, the selector switch 25, and the ON/OFF switch 33.

Next, the operation will be described.

The shape coding apparatus 101a1 of this first embodiment is identical to the conventional apparatus 200a1 shown in FIG. 10, and the transparency coding apparatus 101a2 of this first embodiment is different from the conventional apparatus 200a2 shown in FIG. 10 only in the following respects (1) and (2).

(1) The transparency coding apparatus 101a2 includes the scaling value detector 100, the encoder 104 for the output of the detector 100, and the scaling unit 101, in place of the maximum value detector 20 and the following encoder 21 in the transparency coding apparatus 200a2.

(2) In the transparency coding apparatus 101a2, a value corresponding to the maximum transparency value is not input to the fixed-value encoder 102 and the mode decision unit 103.

So, hereinafter, only the difference in operation from the conventional apparatus 200a2 will be described.

When the transparency signal Sk is applied to the input terminal 2 of the transparency coding apparatus 101a2, initially, the scaling value detector 100 detects the scaling value Ssc which corresponds to the scale factor for the transparency values of the inside-VOP pixels, based on the transparency signal Sk. The maximum transparency value (MAX) of the inside-VOP pixels is detected as the scaling value. The reason is as follows. Since the transparency values of the outside-VOP pixels are "0", the maximum transparency value of the inside-VOP pixels corresponds to the dynamic range of the transparency value.

In the detection of the scaling value, amongst the transparency values of the inside-VOP pixels, the transparency value of the highest frequency (most frequent value) may be detected as the scaling value. The scaling value (maximum value or most frequent value) is equivalent to "255(=the maximum value of 8 bits)×A". The factor A is the scale factor for the transparency value.

In the scaling unit 101, the input transparency signal Sg is multiplied by 255/(255×A) with reference to the detected scaling value Ssc, and the result of the multiplying, i.e., a scaled transparency signal Jg, is output to the blocking unit 22.

Assuming that the scaling value of the transparency signal Sg (maximum value or most frequent value) is 255×A, to multiply the transparency signal by 255/(255×A) in the scaling unit 101 results in a scaled transparency signal Jg having "255" as its maximum value or most frequent value. Consequently, the output Bjg of the blocking unit 22 also has "255" as the maximum value or the most frequent value of the transparency values of the inside-VOP pixels.

Accordingly, in this first embodiment, there are three coding modes as follows.

(1) Mode 1: all the pixels included in the target macroblock to be processed are outside-VOP pixels.

Since the transparency values of the outside-VOP pixels are "0", coding of the transparency signal is omitted, and only a coding mode signal indicating that the coding mode is Mode 1 is coded.

(2) Mode 2: all the inside-VOP pixels included in the target macroblock have the transparency value "255".

Also in this case, coding of the transparency signal is omitted, and only a coding mode signal indicating that the coding mode is Mode 2 (i.e., all the inside-VOP pixels included in the macroblock have the transparency value "255") is coded.

(3) Mode 3: the situation is other than described above, that is, the target macroblock includes some inside-VOP pixels, and some of the inside-VOP pixels have the transparency values other than "255".

In this case, coding of the transparency signal is carried out. To be specific, the transparency values of the inside-VOP pixels included in the target macroblock are coded. Further, a coding mode signal indicating that the transparency values of the inside-VOP pixels in the target macroblock are coded, is coded as well. Then, a coded transparency signal (coded waveform data) Cg obtained by coding the transparency values, and a coded mode signal CMo1 obtained by coding the coding mode signal are output as transparency data Cgr (refer to FIGS. 5(c) and 5(d)).

In the transparency coding apparatus 100a2, in contrast with the conventional apparatus 200a2, when the transparency signal in which all the transparency values of the inside-VOP pixels are "255×A" is input, the scaling unit 101 performs scaling on the transparency signal to change the transparency values "255×A" of the inside-VOP pixels to "255", before coding the transparency signal. Therefore, it is apparent that the coding process of Mode 2 or 3 is not affected by the scale factor A of the transparency value of the transparency signal.

So, in the mode decision unit 103, when all the inside-VOP pixels included in the target macroblock have the transparency value "255", it is decided that the coding process of Mode 2 should be performed. At this time, the selector switch 25 selects the output Ldg2 of the fixed-value encoder 102, under control of the mode decision signal Mo1 output from the mode decision unit 103. The fixed value encoder 102 outputs a transparency signal in which all the inside-VOP pixels in the target macroblock have the transparency value "255", as a locally decoded transparency signal Ldg2 of the target macroblock. Thereby, efficient coding is realized, like the conventional transparency coding apparatus 200a2.

Further, in the transparency coding apparatus 101a2 of the first embodiment, since the input transparency signal is subjected to scaling as described above, it is not necessary to input the maximum transparency value "255×A" of the inside-VOP pixels, which is the output of the maximum value detector 20, into the mode decision unit 23 and the fixed-value encoder 31. Therefore, in the coding unit 110a for block-by-block coding the transparency signal in the transparency coding apparatus 101a2 of the first embodiment, constant coding is carried out without regard to the maximum value or most frequent value "255×A" for each VOP of the input transparency signal Sg.

Accordingly, when compositing an object (foreground image) and a background image, even if the composition ratio corresponding to the scale factor A is uniformly changed for all the pixels of the foreground image, this change does not affect the coded transparency signal (coded waveform signal) Cg of block data corresponding to each macroblock.

On the other hand, when the mode decision unit 103 decides that the coding mode should be Mode 1, the selector switch 25 selects the output Ldg1 of the outside-VOP encoder 30, under control of the mode decision signal Mo. When the mode decision unit 103 decides that the coding mode should be Mode 3, the selector switch 25 selects the output of the intra/inter-frame encoder 32, under control of the mode decision signal Mo.

In any case, the coding mode signal Mo is coded by the encoder 26, and a coded mode signal CMo1 is output.

Further, the scaling value Ssc (maximum value or most frequent value) detected as described above is coded by the encoder 104, and coded scaling data Csc is output from the encoder 104.

The coded mode signal CMo and the coded transparency signal Cgr are grouped as a coded transparency signal Cg, and the coded transparency signal Cg is included in the coded bit stream C (refer to FIG. 5) together with the coded scaling data Csc, the coded shape signal Ck, and the coded color data Cy, Cu, and Cv, to be transmitted to the decoding end.

Next, the data structure of a coded image signal obtained by the image processing apparatus of the first embodiment will be briefly described.

FIGS. 5(a)–5(d) illustrate the data structure of the coded image signal.

The data structure of the coded image signal C1 is different from the data structure of the coded image signal C shown in FIGS. 12(a)–12(d) only in the transparency information included in the VOP header Hv.

To be specific, in the coded image signal C obtained by the conventional image processing apparatus, the VOP header Hv includes the coded data Cgm indicating the maximum transparency value. On the other hand, in the coded image signal C1 obtained by the image processing apparatus of this first embodiment, the VOP header Hv includes the coded data Csc of the scaling value relating to the transparency signal.

As described above, according to the first embodiment of the invention, based on the transparency signal in which the scale of transparency value is changed by using the fixed scale factor A, the scaling value corresponding to the fixed scale factor A is detected, and then the transparency signal with the converted scale of transparency value is subjected to scaling based on the scaling value to restore the scale of transparency value to the original scale. Thereafter, the transparency signal is subjected to waveform coding to obtain the coded transparency signal (coded waveform data) Cgr while the scaling value is coded to obtain the coded scaling signal Csc, and these signals Cgr and Csc are transmitted to the decoding end. Accordingly, the process of uniformly changing the transparency values constituting the transparency signal in VOP units by appropriately changing the scaling value can be carried out easily and independently of the transparency signal coding process.

Further, in the coded image signal C1 having the data structure obtained by the image coding process of the first embodiment, since the transparency data Cgr corresponding to each macroblock has no relation to the scaling value related to the transparency signal, decoding of the coded transparency signal (coded waveform signal) Cgr of the macroblock can be performed independently of the scaling value of the transparency signal.

Accordingly, in an apparatus for editing the coded image signal C1, the scaling value Ssc of the transparency signal is edited in the state of the corresponding coded signal Csc, whereby the transparency values of the inside-VOP pixels can be uniformly changed.

Embodiment 2

Figure 2:
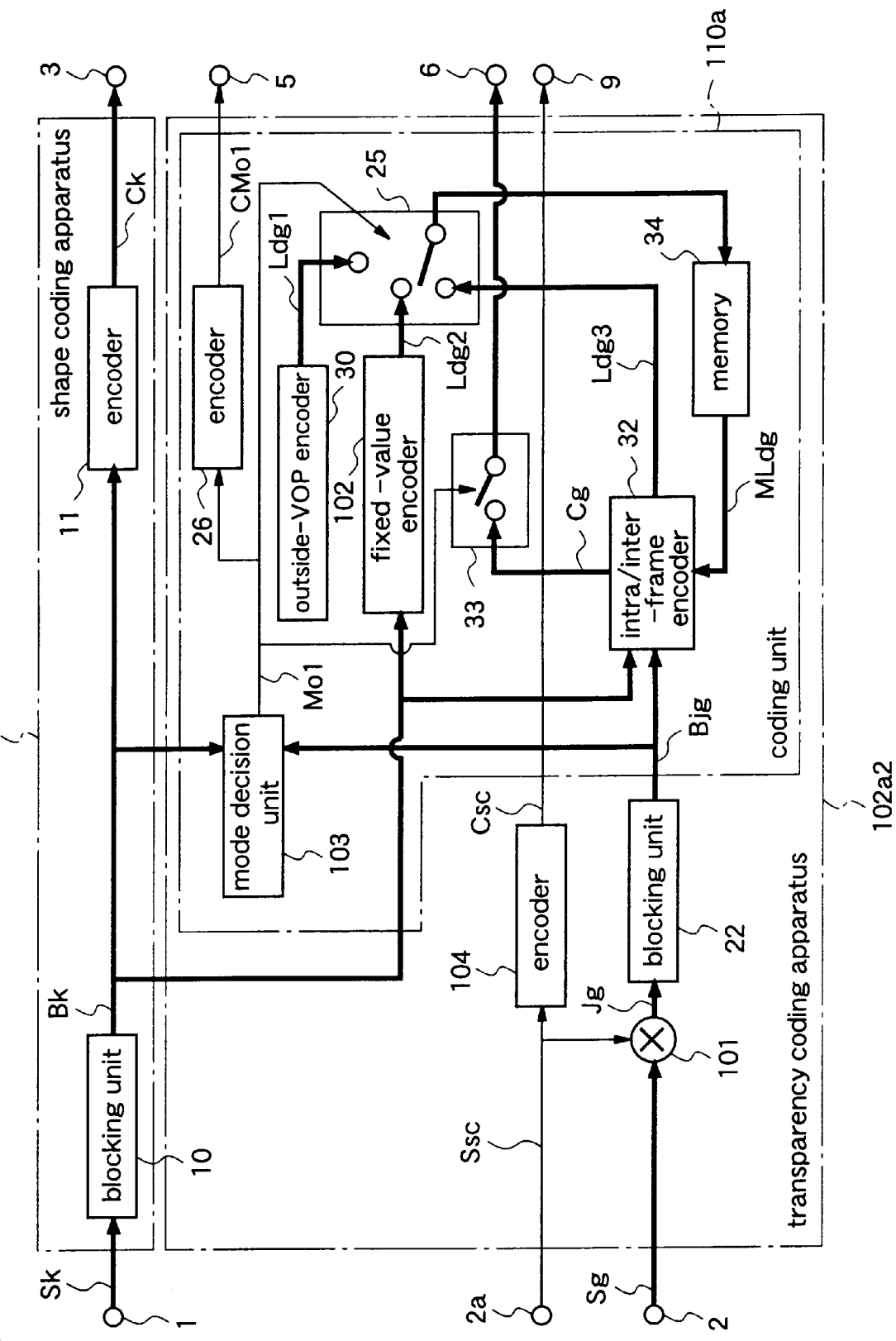
FIG. 2 is a block diagram for explaining an image processing apparatus according to a second embodiment of the present invention, illustrating a transparency coding apparatus and a shape coding apparatus which are constituents of the image processing apparatus.

FIG. 2 is a block diagram for explaining an image processing apparatus according to a second embodiment of the present invention, illustrating a transparency coding apparatus included in the image processing apparatus. Since coding of a transparency signal is closely related with a shape signal, FIG. 2 shows a shape coding apparatus as a constituent of the image processing apparatus, together with the transparency coding apparatus.

The shape coding apparatus 102a1 according to this second embodiment comprises a blocking unit 10 which blocks a shape signal Sk, and an encoder 11 which encodes the output (blocked shape signal) Bk of the blocking unit 10, like the shape coding apparatus 101a1 of the first embodiment.

The transparency coding apparatus 101a2 of the first embodiment has the scaling value detector 100 which detects the scaling value Ssc according to the transparency signal Sg, and the transparency signal Sg is subjected to scaling based on the scaling value Ssc output from the detector 100. However, the transparency coding apparatus 102a2 of the second embodiment has no scaling value detector, and scaling of the transparency signal Sg is carried out by using a scaling value Ssc1 which is directly input from the outside.

Other constituents of the transparency coding apparatus 102a2 of this second embodiment are identical to those of the apparatus 101a2 of the first embodiment.

Further, the operation of the transparency coding apparatus 102a2 is different from the operation of the apparatus 101a1 of the first embodiment only in that the scaling value Ssc1 is input directly to the scaling unit 101 from the outside. Other operations are identical to those of the first embodiment.

In the second embodiment of the invention, the transparency coding apparatus 102a2 is provided with the input terminal 2a to which the scaling value Ssc of the transparency signal Sg from the outside is directly input, and scaling of the transparency signal Sg is carried out according to the scaling value Ssc. Therefore, the process of uniformly changing the transparency values constituting the transparency signal in VOP units by changing the scaling value can be carried out easily and independently of the transparency signal coding process, with the circuit structure simpler than that of the transparency coding apparatus 101a2 of the first embodiment.

To be specific, in an image signal created by special means such as computer graphics, the feature of the transparency signal is sometimes known in advance, and a scaling value of high coding efficiency may be obtained by calculation.

In this case, to perform scaling on the transparency signal by using a scaling value which has previously been calculated and input directly to the apparatus from the outside (second embodiment), has the advantage of reducing the circuit scale and enhancing the throughput, over to detect the scaling value by the scaling value detector 100 (first embodiment).

Embodiment 3

Figure 3:
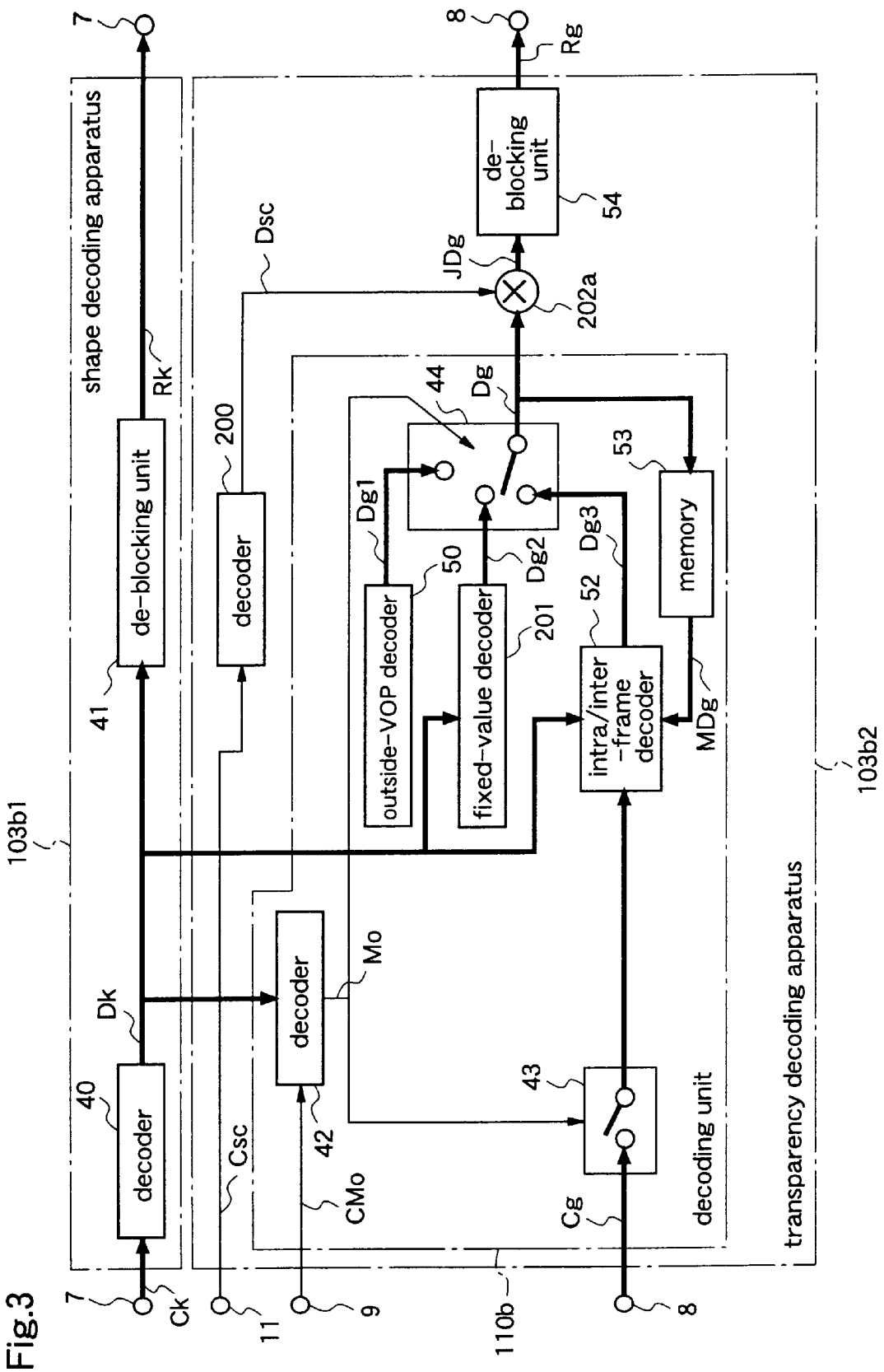
FIG. 3 is a block diagram for explaining an image processing apparatus according to a third embodiment of the present invention, illustrating a transparency decoding apparatus and a shape decoding apparatus which are constituents of the image processing apparatus.

FIG. 3 is a block diagram for explaining an image processing apparatus according to a third embodiment of the present invention, illustrating a transparency decoding apparatus included in the image processing apparatus. Since decoding of a transparency signal is closely related with a shape signal, FIG. 3 shows a shape decoding apparatus as a constituent of the image processing apparatus, together with the transparency decoding apparatus.

The image processing apparatus of this third embodiment is for decoding coded image data output from the image processing apparatus of the first or second embodiment. That is, the transparency decoding apparatus 103b2 shown in FIG. 3 decodes transparency data Cgr obtained by coding a transparency signal by the transparency coding apparatus 101a2 or 102a2 of the first or second embodiment. Further, the shape decoding apparatus 103b1 shown in FIG. 3 decodes a coded shape signal Ck obtained by coding a shape signal by the shape coding apparatus 101a1 or 102a1 of the first or second embodiment.

Figure 11:
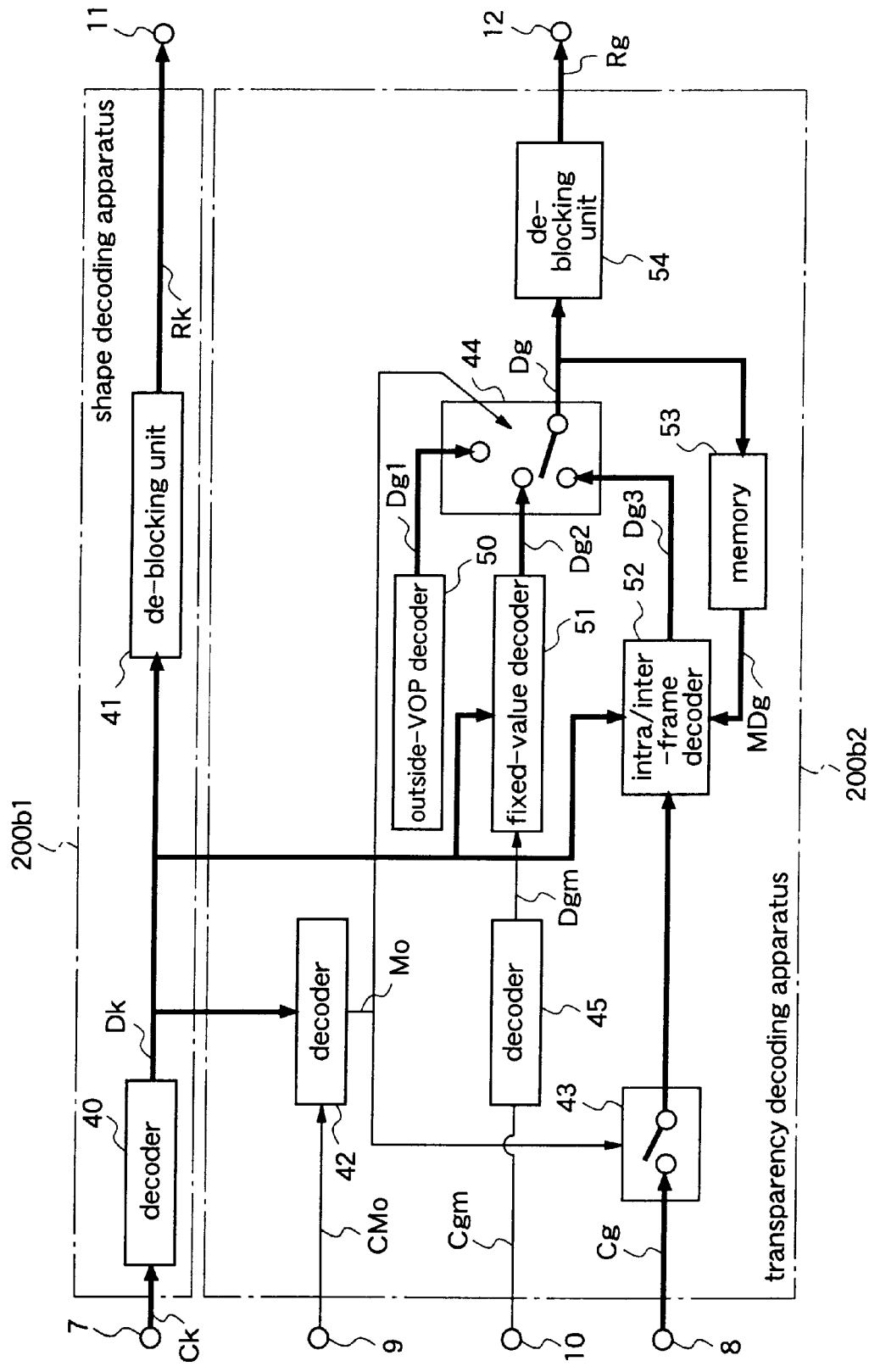
FIG. 11 is a block diagram for explaining a conventional image processing apparatus, illustrating a transparency decoding apparatus and a shape decoding apparatus which are constituents of the image processing apparatus.

The shape decoding apparatus 103b1 of the third embodiment comprises a decoder 40 which decodes the coded shape signal Ck applied to the input terminal 7 to output a decoded shape signal Dk, and a de-blocking unit 41 which integrates the outputs (decoded shape signals Dk) of the blocking unit 41 to generate a reproduced shape signal Rk corresponding to an object region comprising a plurality of macroblocks, like the conventional shape decoding apparatus 200b1 shown in FIG. 11.

Further, the transparency decoding apparatus 103b2 of this third embodiment includes a decoder 200 and a scaling unit 202a, instead of the decoder 45 for decoding the coded maximum value data Cgm, included in the conventional transparency decoding apparatus 200b2 shown in FIG. 11. The decoder 200 decodes the coded scaling data Csc input to the input terminal 11 to output a reproduced scaling value Dsc. The scaling unit 202a performs scaling on the decoded transparency signal Dg obtained by decoding the coded transparency signal Cg, based on the reproduced scaling value Dsc.

Other constituents of the transparency decoding apparatus 103b2 are fundamentally identical to those of the conventional transparency decoding apparatus 200b2 shown in FIG. 11. That is, the transparency decoding apparatus 103b2 comprises a mode decoder 42, an outside-VOP decoder 50, a fixed-value decoder 201, an intra/inter-frame decoder 52, a memory 53, an ON/OFF switch 43, and a selector switch 44, which elements are constituents of a decoding unit 110b. Further, the transparency decoding apparatus 103b2 includes a de-blocking unit 54.

In the transparency decoding apparatus 103b2, however, the de-blocking unit 54 subjects the output Jdg of the scaling unit 202a to de-blocking to output a reproduced transparency signal Rg corresponding to the object region. Further, the fixed-value decoder 201 outputs a decoded transparency signal Dg2 whose transparency value is fixed, based on the decoded shape signal Dk, without referring to the maximum transparency value of the inside-VOP pixels.

Next, the operation will be described.

The shape decoding apparatus 103b1 of this third embodiment is identical to the conventional apparatus 200b1 shown in FIG. 11, and the transparency decoding apparatus 103b2 of this third embodiment is different from the conventional apparatus 200b2 shown in FIG. 11 only in the following respects (1) and (2).

(1) The transparency decoding apparatus 103b2 includes the decoder 200 which decodes the coded data Csc of the scaling value Ssc, and the scaling unit 202a which performs scaling on the decoded transparency signal Dg by using the output of the decoder 200, instead of the decoder 45 of the conventional transparency decoding apparatus 200b2.

(2) In the transparency decoding apparatus 103b2, a value corresponding to the maximum transparency value is not input to the fixed-value decoder 201.

Hereinafter, the operation of the transparency decoding apparatus 103b2 will be described with respect to the difference from the conventional apparatus 200b2.

When the coded mode signal Csc is input to the input terminal 9 of the transparency decoding apparatus 103b2, the decoder 42 decodes the coded mode signal Csc for each macroblock, based on the decoded shape signal Dk generated by the decoder 40 of the shape decoding apparatus 103b1, thereby reproducing the coding mode signal Mo corresponding to each macroblock, which is used in the transparency coding apparatus.

The selector switch 44 is controlled by the coding mode signal Mo. When the coding mode signal Mo indicates Mode 2, the selector switch 44 selects the output Dg2 of the fixed-value decoder 201.

In this case, the fixed-value decoder 201 generates the decoded transparency signal Dg2 in which the transparency values of the inside-VOP pixels in the target macroblock are "255"(=the maximum value of 8 bits) and the transparency values of the outside-VOP pixels are "0".

On the other hand, when the coding mode signal Mo indicates Mode 1, the selector switch 44 selects the output Dg1 of the outside-VOP decoder 50, and when the coding mode signal Mo indicates Mode 3, the switch 44 selects the output Dg3 of the intra/inter-frame decoder 52. Further, the decoder 200 decodes the coded signal Csc of the scaling value Ssc to output a reproduced scaling value Dsc of the transparency signal.

The output Dg of the selector switch 44 is stored in the memory 53 and, at the same time, supplied to the scaling unit 202a. The scaling unit 202a subjects the output Dg of the selector switch 44 to scaling based on the reproduced scaling value Dsc, and supplies a decoded and scaled transparency signal JDg to the de-blocking unit 54.

The de-blocking unit 54 integrates the decoded and scaled transparency signals JDg to generate a reproduced transparency signal Rg corresponding to an object region comprising predetermined macroblocks, and outputs this signal Rg from the output terminal 8.

The scaling performed by the scaling unit 202a is the inverse operation of the operation performed by the scaling unit 101 shown in FIG. 1. That is, in the scaling unit 202a, the output Dg of the switch 44 is multiplied by (255×A)/255.

Thereby, in the transparency decoding apparatus 103b2 of the third embodiment, like the conventional transparency decoding apparatus 200b2 shown in FIG. 11, the fixed transparency values "255×A" of the inside-VOP pixels in the target macroblock are correctly reproduced, based on the coding mode signal indicating that the transparency values of the inside-VOP pixels are fixed.

As the result, the operation of the decoding unit 110b in the transparency decoding apparatus 103b2 becomes irrelevant to the scaling value "255×A" which is the maximum value or most frequent value of the transparency signal.

Accordingly, even when the scaling value corresponding to the composition ratio A included in the VOP header Hv of the coded image signal C1 is changed, this change hardly affects the coded transparency data Cgr of each macroblock. Therefore, it is not necessary to encode the transparency signal again when changing the composition ratio A of the coded image signal of the target image.

As described above, according to the third embodiment of the present invention, a coded transparency signal, which has been obtained by subjecting a transparency signal to scaling and coding at the coding end, is decoded to generate a decoded transparency signal, and then the decoded transparency signal is subjected to inverse scaling. Therefore, even if the input coded transparency signal has been subjected to change of the scaling value in the state of the coded data, decoding of the coded transparency signal can be correctly performed by subjecting the decoded transparency signal obtained by decoding the coded transparency signal to scaling based on the changed scaling value.

As the result, the process of uniformly changing the scale of transparency values of the transparency signal in VOP units can be easily performed regardless of decoding of the coded transparency signal at the decoding end, before or after coding of the transparency signal.

Embodiment 4

Figure 4:
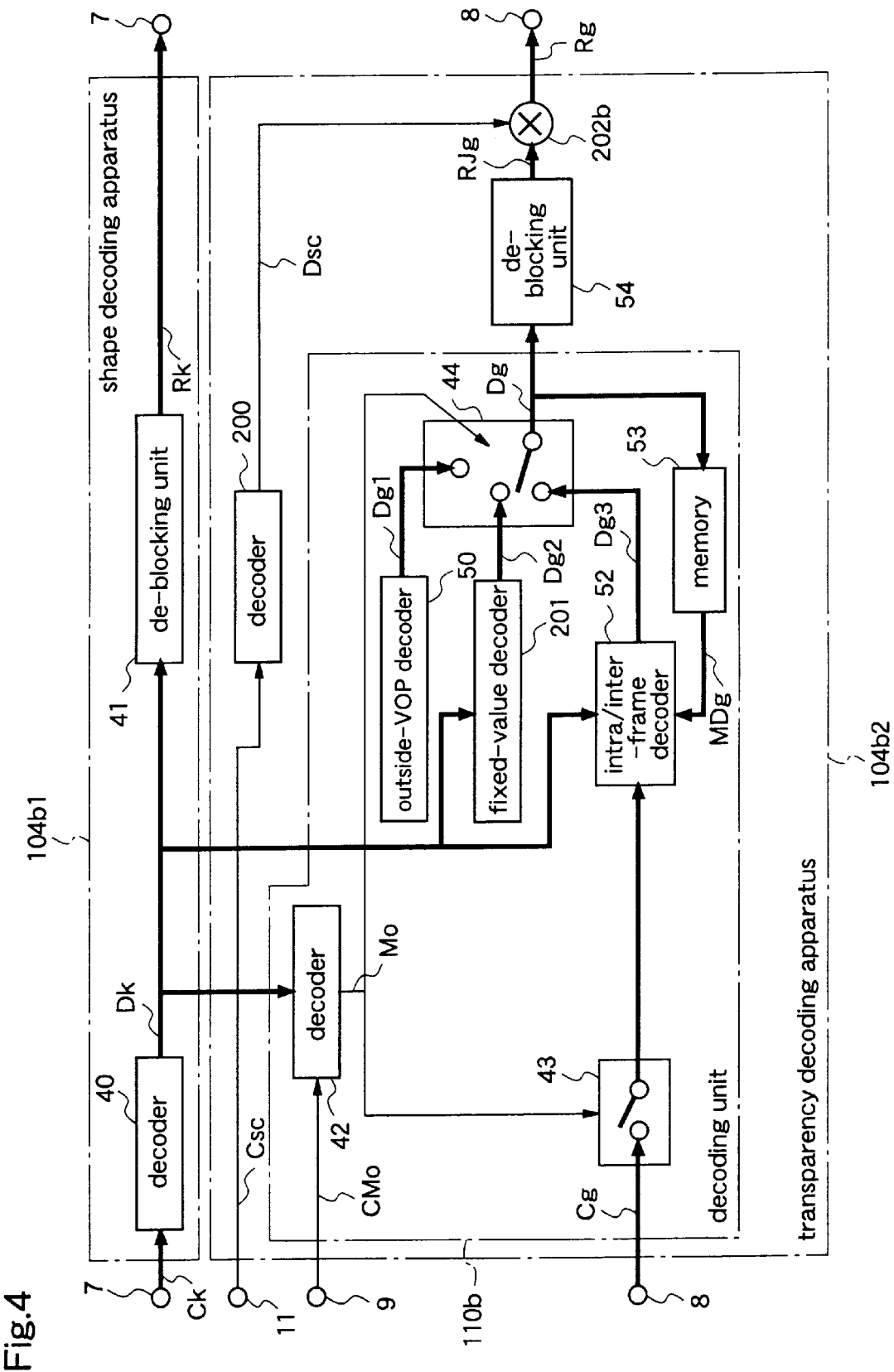
FIG. 4 is a block diagram for explaining an image processing apparatus according to a fourth embodiment of the present invention, illustrating a transparency decoding apparatus and a shape decoding apparatus which are constituents of the image processing apparatus.

FIG. 4 is a block diagram illustrating an image processing apparatus according to a fourth embodiment of the present invention, illustrating a transparency decoding apparatus included in the image processing apparatus. Since decoding of a transparency signal is closely related with a shape signal, FIG. 4 shows a shape decoding apparatus as a constituent of the image processing apparatus, together with the transparency decoding apparatus.

The shape decoding apparatus 104b1 of this fourth embodiment comprises a decoder 40 which decodes the coded shape signal Ck, and a de-blocking unit 41 which integrates the decoded shape signals Dk corresponding to the respective blocks (outputs of the blocking unit 41) to generate a reproduced shape signal Rk, like the shape decoding apparatus 103b1 of the third embodiment.

Further, the transparency decoding apparatus 104b2 of this fourth embodiment includes a scaling unit 202b which is located after the de-blocking unit 54 and performs scaling on the output of the de-blocking unit 54, instead of the scaling unit 202a which is located before the de-blocking unit 54 in the transparency decoding apparatus 103b2 of the third embodiment.

Other constituents of the transparency decoding apparatus 104b2 of this fourth embodiment are identical to those of the apparatus 103b2 of the third embodiment.

In the transparency decoding apparatus 104b2 so constructed, like the apparatus 103b2 of the third embodiment, a coded transparency signal which has been subjected to scaling is decoded to generate a decoded transparency signal Dg corresponding to each macroblock. Thereafter, the decoded transparency signals Dg are integrated by the de-blocking unit 54 to generate a decoded transparency signal RJg corresponding to an object region comprising predetermined macroblocks.

In the scaling unit 202b, the decoded transparency signal RJg is subjected to scaling by using a function which is an inverse of the function for scaling at the coding end, based on a decoded scaling value Dsc from the decoder 200, whereby a reproduced transparency signal Rg corresponding to the object region is generated.

In this fourth embodiment, since scaling is performed on the decoded and integrated transparency signal Rjg, the same effects as those provided by the third embodiment in which the decoded transparency signals Dg corresponding to the respective macroblocks are subjected to scaling by using the inverse function and then integrated by de-blocking, are provided.

The reason why the fourth embodiment can provide the same effects as those of the third embodiment is because, in the decoding process of the coded transparency signal in object units, the de-blocking for integrating the decoded transparency signals corresponding to plural macroblocks is a process in which the transparency values of the decoded transparency signals are not changed at all.

When an image processing program for implementing the structure of the transparency coding or decoding apparatus according to any of the aforementioned embodiments by software is recorded in a storage medium such as a floppy disk, the transparency signal coding or decoding process according to any of the aforementioned embodiments can be easily implemented in an independent computer system.

Figure 6:
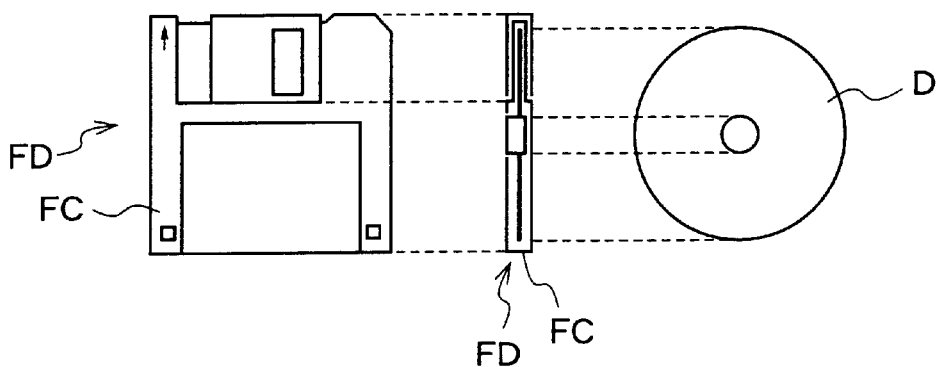
FIGS. 6(a) and 6(b) are diagrams for explaining a data storage medium which contains a program implementing a coding or decoding process according to any of the aforementioned embodiments by a computer system.
FIG. 6(c) is a diagram illustrating the computer system.
Figure 6:
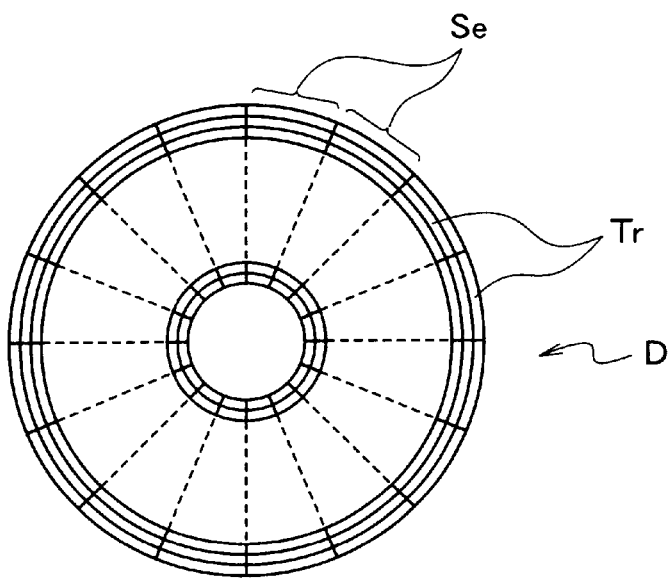
Figure 6:
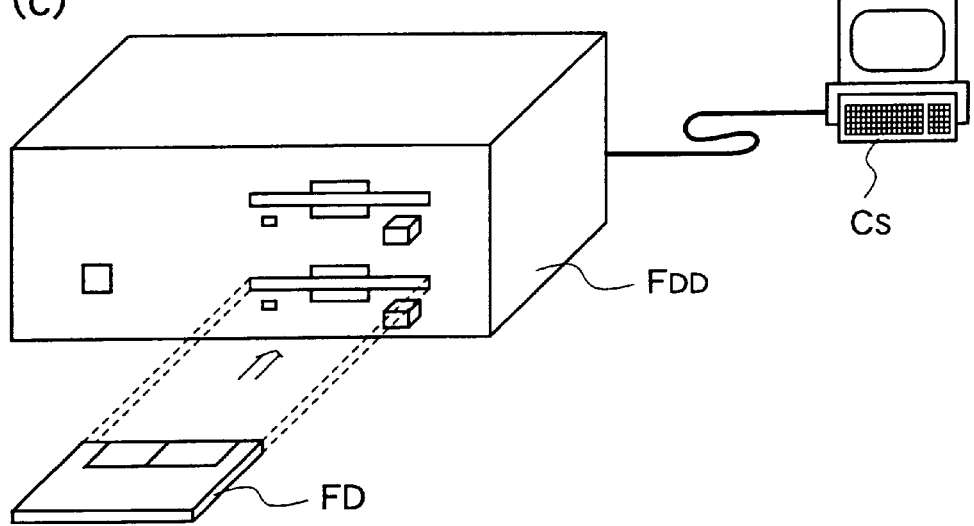
Figure 7:
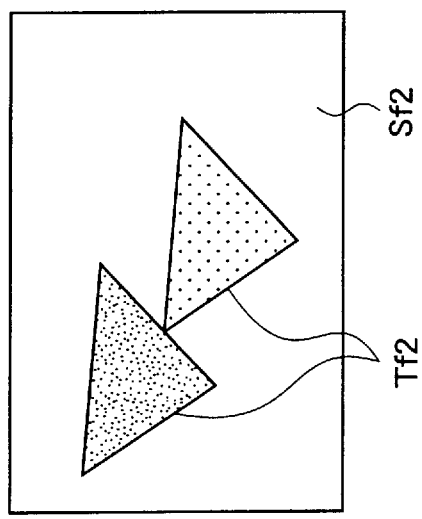
FIGS. 7(a)–7(e) are diagrams for explaining an image composition process, illustrating an image obtained from a color signal of a background image (FIG. 7(a)), images obtained from color signals of first and second target images (FIGS. 7(a) and 7(d)), and images obtained from transparency signals of the first and second target images (FIGS. 7(c) and 7(e)).
Figure 7:
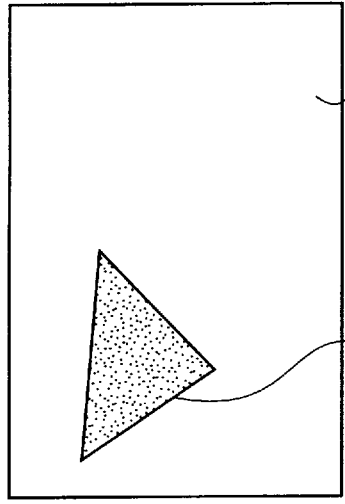
Figure 7:
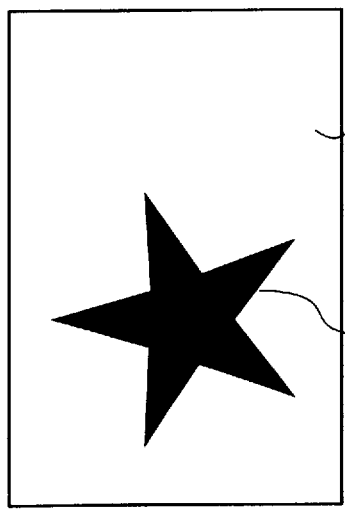
Figure 7:
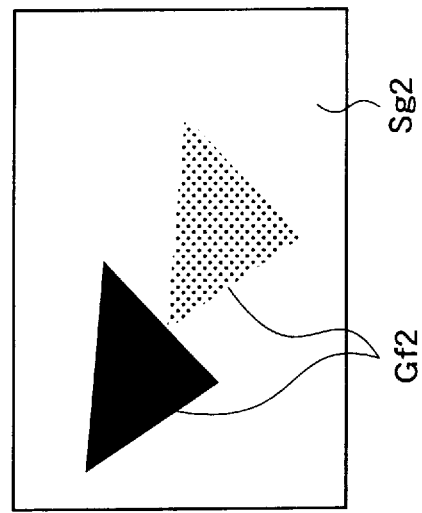
Figure 7:
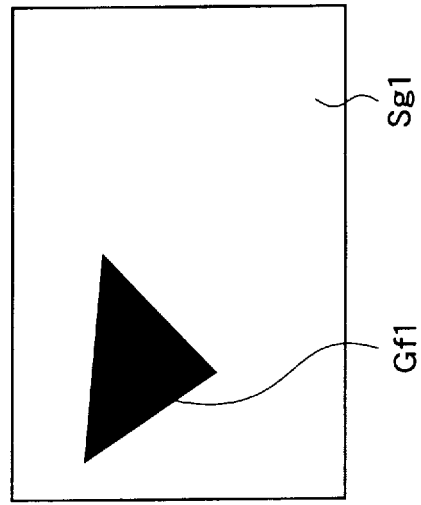
Figure 8:
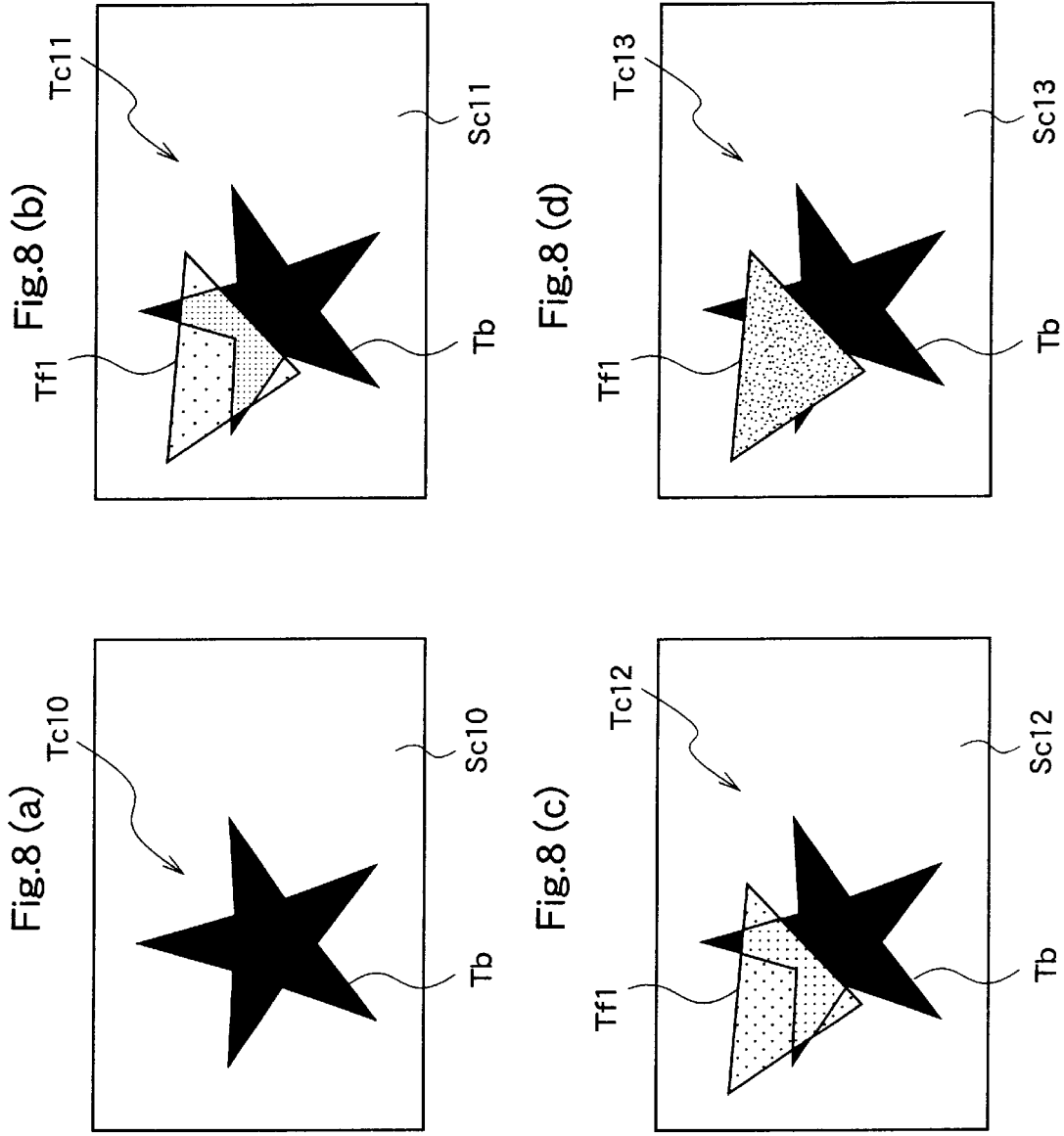
FIGS. 8(a)–8(d) are diagrams illustrating how the first target image changes due to fade-in, when compositing the first target image and the background image.
Figure 9:
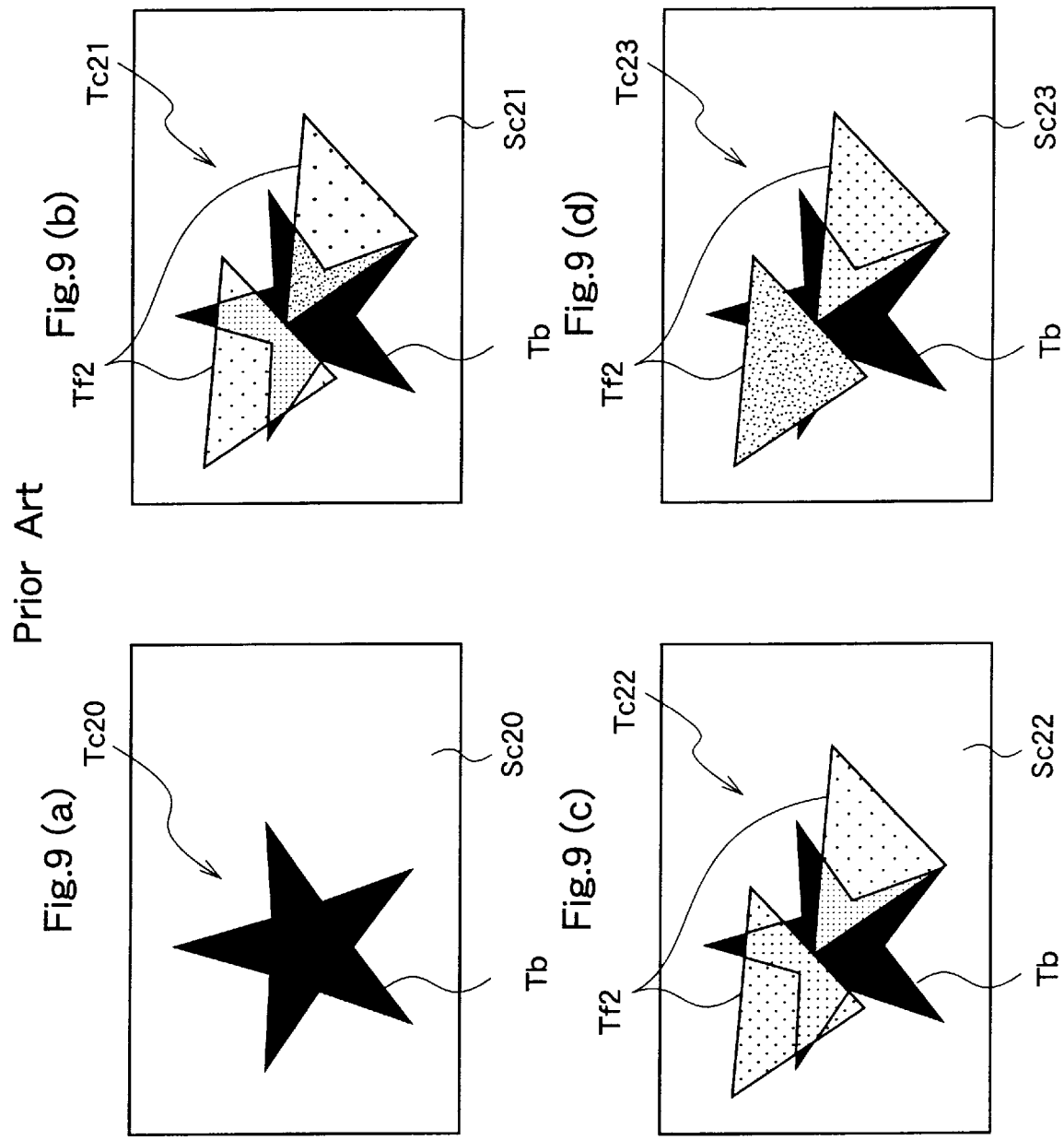
FIGS. 9(a)–9(d) are diagrams illustrating how the second target image changes due to fade-in, when compositing the second target image and the background image.

FIGS. 6(a)–6(c) are diagrams for explaining the case where the transparency signal coding process or decoding process according to any of the aforementioned embodiments is executed by a computer system using a floppy disk which contains the image processing program.

FIG. 6(a) shows a front view of a floppy disk FD, a cross-sectional view thereof, and a floppy disk body D. FIG. 6(b) shows an example of a physical format of the floppy disk body D.

The floppy disk FD is composed of the floppy disk body D and a case FC which contains the floppy disk body D. On the surface of the disk body D, a plurality of tracks Tr are formed concentrically from the outer circumference of the disk toward the inner circumference. Each track is divided into 16 sectors (Se) in the angular direction. Therefore, in the floppy disk FD containing the above-mentioned program, data of the program are recorded in the assigned sectors on the floppy disk body D.

FIG. 6(c) shows the structure for recording the program in the floppy disk FD and performing the image processing with software by using the program stored in the floppy disk FD.

To be specific, when the program is recorded in the floppy disk FD, data of the program are written in the floppy disk FD from the computer system Cs through the floppy disk drive FDD. When the above-mentioned transparency coding or decoding apparatus is constructed in the computer system Cs by the program recorded in the floppy disk FD, the program is read from the floppy disk FD by the floppy disk drive FDD and then loaded to the computer system Cs.

Although in the above description a floppy disk is employed as a data storage medium, an optical disk may be employed. Also in this case, coding and decoding can be performed by software in like manner as the case of using the floppy disk. The data storage medium is not restricted to these disks, and any medium may be employed as long as it can contain the program, for example, an IC card or a ROM cassette.

Furthermore, when a coded image signal stored in a data storage medium like a floppy disk has the data structure described for the first embodiment, the coded image signal from the floppy disk can be correctly decoded by the image processing apparatus according to the third or fourth embodiment.

Although in the present invention emphasis has been placed on coding and decoding of a transparency signal, when the transparency signal is in the form expressed by formula (2), it is necessary to change the values of luminance and chrominance signals with the change of the transparency signal. In this case, a circuit structure corresponding to the scaling unit 101 or the scaling unit 202a (202b) is added in a coding or decoding apparatus of a color signal relating to the luminance and chrominance signals, under the same conception as for the case of the transparency signal described above.

Furthermore, although in the present invention transparency coding is described with the coding method of MPEG4 as an example, methods of implementing the coding unit 110a (first and second embodiments) and the decoding unit 110b (third and fourth embodiments) may be other than those described for the invention. For example, the coding unit 110a may be constructed so that it does not perform inter-frame coding but performs only intra-frame coding, and the decoding unit may be constructed so that it does not perform inter-frame decoding but performs only intra-frame decoding.

Moreover, although the scaling process according to the present invention employs the scaling value "255×A", it may use the scaling value "255×A+B". However, when the factor B varies according to the image, not only the scaling value "255×A" but also the factor B must be encoded to be transmitted to the decoding end.

What is claimed is:

1. An image processing apparatus for coding a transparency signal corresponding to an object constituting an image, said transparency signal indicating a composition ratio used when compositing an image signal corresponding to the object with another image signal, said apparatus comprising:

scaling value detection means for receiving a transparency signal which has been subjected to a process of changing its signal value with a fixed scale factor, and detecting a specific signal value corresponding to the fixed scale factor, as a scaling value;

scaling means for performing scaling on the transparency signal whose signal value has been changed, by using the detected scaling value, and outputting a scaled transparency signal whose signal value is restored to the signal value before the change;

first coding means for coding the scaling value to output coded scaling value data;

blocking means for dividing the scaled transparency signal into signals corresponding to a plurality of blocks each comprising a predetermined number of pixels, and outputting a transparency signal corresponding to each block; and second coding means for coding the transparency signal corresponding to each block to output a coded transparency signal;

wherein the coded scaling value data and the coded transparency signal corresponding to each block are output as coded data of the transparency signal.

2. An image processing apparatus for coding a transparency signal corresponding to an object constituting an image, said transparency signal indicating a composition ratio used when compositing an image signal corresponding to the object with another image signal, said apparatus comprising:

scaling means for performing scaling on a transparency signal whose signal value has been changed with a fixed scale factor, by using a scaling value which is a specific signal value corresponding to the fixed scale factor and is supplied from the outside, and outputting a scaled transparency signal whose signal value has been restored to the signal value before the change;

first coding means for coding the scaling value to output coded scaling value data;

blocking means for dividing the scaled transparency signal into signals corresponding to a plurality of blocks each comprising a predetermined number of pixels, and outputting a transparency signal corresponding to each block; and second coding means for coding the transparency signal corresponding to each block to output a coded transparency signal;

wherein the coded scaling value data and the coded transparency signal corresponding to each block are output as coded data of the transparency signal.

3. An image processing apparatus for decoding a coded transparency signal which has been obtained by coding a transparency signal corresponding to an object constituting an image, said transparency signal indicating a composition ratio used when compositing an image signal corresponding to the object with another image signal, said apparatus comprising:

first decoding means for decoding first coded data included in the coded transparency signal to output a scaling value corresponding to a fixed scale factor for the value of the transparency signal of the object;

second decoding means for decoding second coded data included in the coded transparency signal to output transparency signals corresponding to a plurality of blocks each comprising a predetermined number of pixels;

scaling means for subjecting the transparency signals corresponding to the respective blocks to a scaling process for changing the values of the transparency signals with the fixed scale factor indicated by the scaling value, and outputting scaled transparency signals; and de-blocking means for integrating the scaled transparency signals to generate a reproduced transparency signal corresponding to an object region which includes the object and comprises a prescribed number of blocks.

4. An image processing apparatus for decoding a coded transparency signal which has been obtained by coding a transparency signal corresponding to an object constituting an image, said transparency signal indicating a composition ratio used when compositing an image signal corresponding to the object with another image signal, said apparatus comprising:

first decoding means for decoding first coded data included in the coded transparency signal to output a scaling value corresponding to a fixed scale factor for the value of the transparency signal of the object;

second decoding means for decoding second coded data included in the coded transparency signal to output transparency signals corresponding to a plurality of blocks each comprising a predetermined number of pixels;

de-blocking means for integrating the scaled transparency signals corresponding to the respective blocks to generate a transparency signal corresponding to an object region which includes the object and comprises a prescribed number of blocks; and scaling means for subjecting the transparency signal corresponding to the object to a scaling process for changing the value of the transparency signal with the fixed scale factor indicated by the scaling value, and outputting a reproduced transparency signal.

5. An image processing method for coding a transparency signal corresponding to an object constituting an image, said transparency signal indicating a composition ratio used when compositing an image signal corresponding to the object with another image signal, said method comprising the steps of:

based on a transparency signal which has been subjected to a process of changing its signal value with a fixed scale factor, detecting a specific signal value corresponding to the fixed scale factor, as a scaling value;

coding the detected scaling value to generate coded scaling value data;

performing scaling on the transparency signal whose signal value has been changed, by using the detected scaling value, to generate a scaled transparency signal whose signal value is restored to the signal value before the change;

coding the scaled transparency signal block by block, each block comprising a predetermined number of pixels, to generate a coded transparency signal; and outputting the coded scaling value data and the coded transparency signal corresponding to each block, as coded data of the transparency signal.

6. An image processing method for coding a transparency signal corresponding to an object constituting an image, said transparency signal indicating a composition ratio used when compositing an image signal corresponding to the object with another image signal, said method comprising the steps of:

performing scaling on a transparency signal whose signal value has been changed with a fixed scale factor, by using a scaling value which is a specific signal value corresponding to the fixed scale factor and is supplied from the outside, to generate a scaled transparency signal whose signal value is restored to the signal value before the change;

coding the scaling value to generate coded scaling value data;

coding the scaled transparency signal block by block, each block comprising a predetermined number of pixels, to generate a coded transparency signal; and outputting the coded scaling value data and the coded transparency signal corresponding to each block, as coded data of the transparency signal.

7. An image processing method for decoding a coded transparency signal which has been obtained by coding a transparency signal corresponding to an object constituting an image, said transparency signal indicating a composition ratio used when compositing an image signal corresponding to the object with another image signal, said method comprising the steps of:

decoding first coded data included in the coded transparency signal to generate a scaling value corresponding to a fixed scale factor for the value of the transparency signal of the object;

decoding second coded data included in the coded transparency signal to generate a transparency signal corresponding to a block comprising a predetermined number of pixels;

subjecting the transparency signal corresponding to the block to a scaling process for changing its value with the fixed scale factor indicated by the scaling value, to generate a scaled transparency signal; and reproducing the scaled transparency signal as a transparency signal whose value has been changed with the fixed scale factor.

8. A data structure for transmitting a coded image signal which has been obtained by coding an image signal including a transparency signal corresponding to an object constituting an image, said transparency signal indicating a composition ratio used when compositing the image signal corresponding to the object with another image signal, wherein:

coded image signals corresponding to a plurality objects are successively arranged in object units;

a coded image signal corresponding each object includes header information corresponding to the object, and macroblock data corresponding to a plurality of macroblocks into which an object region including the object is divided, each of said macroblocks comprising a predetermined number of pixels, and said macroblock data following the header information;

the header information includes scaling information indicating a fixed scale factor used when changing the signal value of the transparency signal; and each macroblock data includes a scaled transparency signal which is obtained by subjecting the transparency signal whose signal value has been changed with the fixed scale factor, to scaling based on the scaling information, thereby restoring the signal value to the signal value before the change.

9. A data storage medium containing an image processing program, wherein said image processing program is a coding program for making a computer perform a transparency signal coding process according to the image processing method of claim 5.

10. A data storage medium containing an image processing program, wherein said image processing program is a coding program for making a computer perform a transparency signal coding process according to the image processing method of claim 6.

11. A data storage medium containing an image processing program, wherein said image processing program is a decoding program for making a computer perform a transparency signal decoding process according to the image processing method of claim 7.

* * * * *